United States Patent
Wolff et al.

(10) Patent No.: US 9,636,620 B2
(45) Date of Patent: May 2, 2017

(54) POROUS ALPHA-SIC-CONTAINING SHAPED BODY HAVING A CONTIGUOUS OPEN PORE STRUCTURE

(71) Applicant: Leif Stiholt, Dybvad (DK)

(72) Inventors: Thomas Wolff, Munchberg (DE); Holger Friedrich, Fischbach (DE)

(73) Assignee: Leif Stiholt, Dybvad (DK)

( * ) Notice: Subject to any disclaimer, the term of this patent is extended or adjusted under 35 U.S.C. 154(b) by 38 days.

(21) Appl. No.: 14/360,060

(22) PCT Filed: Nov. 19, 2012

(86) PCT No.: PCT/EP2012/073003
§ 371 (c)(1),
(2) Date: May 22, 2014

(87) PCT Pub. No.: WO2013/076045
PCT Pub. Date: May 30, 2013

(65) Prior Publication Data
US 2014/0311111 A1    Oct. 23, 2014

(30) Foreign Application Priority Data
Nov. 23, 2011 (EP) .................................. 11190377

(51) Int. Cl.
*B01D 50/00* (2006.01)
*B01D 39/20* (2006.01)
*B01D 39/14* (2006.01)
*B01D 39/06* (2006.01)
*B01D 46/24* (2006.01)
*C04B 35/565* (2006.01)
*C04B 35/573* (2006.01)
*C04B 38/00* (2006.01)
*B01J 27/224* (2006.01)
*F27D 19/00* (2006.01)
*C04B 111/00* (2006.01)

(52) U.S. Cl.
CPC ........ *B01D 46/2418* (2013.01); *B01J 27/224* (2013.01); *C04B 35/565* (2013.01); *C04B 35/573* (2013.01); *C04B 38/0009* (2013.01); *F27D 19/00* (2013.01); *C04B 2111/0081* (2013.01); *C04B 2111/00793* (2013.01); *C04B 2235/383* (2013.01); *C04B 2235/3817* (2013.01); *C04B 2235/3821* (2013.01); *C04B 2235/402* (2013.01); *C04B 2235/421* (2013.01); *C04B 2235/425* (2013.01); *C04B 2235/428* (2013.01); *C04B 2235/5436* (2013.01); *C04B 2235/606* (2013.01); *C04B 2235/616* (2013.01); *C04B 2235/656* (2013.01); *C04B 2235/6567* (2013.01); *C04B 2235/661* (2013.01); *C04B 2235/722* (2013.01); *C04B 2235/723* (2013.01); *C04B 2235/762* (2013.01); *C04B 2235/767* (2013.01); *C04B 2235/80* (2013.01)

(58) Field of Classification Search
CPC .... B01J 27/224; C04B 35/565; C04B 35/573; C04B 38/0009; F27D 19/00
See application file for complete search history.

(56) References Cited

U.S. PATENT DOCUMENTS

| | | | |
|---|---|---|---|
| 3,097,930 A | 7/1963 | Holland | |
| 3,175,918 A | 3/1965 | McGahan et al. | |
| 3,345,440 A | 10/1967 | Googin et al. | |
| 3,833,386 A | 9/1974 | Wood et al. | |
| 4,777,152 A | 10/1988 | Tsukada | |
| 4,981,665 A | 1/1991 | Boecker et al. | |
| 5,202,105 A * | 4/1993 | Boecker | B82Y 30/00 117/7 |
| 6,017,473 A | 1/2000 | Maier et al. | |
| 6,582,796 B1 | 6/2003 | Joulin et al. | |
| 7,648,932 B2 | 1/2010 | Weisensel et al. | |
| 7,867,313 B2 | 1/2011 | Travitzky et al. | |
| 2002/0011683 A1 | 1/2002 | Gadkaree et al. | |
| 2007/0130897 A1* | 6/2007 | Sakaguchi | B01D 46/0001 55/523 |
| 2009/0093358 A1 | 4/2009 | Quadir et al. | |
| 2009/0173050 A1 | 7/2009 | Travitzky et al. | |
| 2009/0267273 A1* | 10/2009 | Kaneda | B01J 35/04 264/631 |
| 2013/0288879 A1* | 10/2013 | Sato | C04B 35/563 501/87 |

FOREIGN PATENT DOCUMENTS

| | | |
|---|---|---|
| DE | 19727115 C2 | 2/1999 |
| EP | 0796830 A1 | 9/1997 |
| EP | 0336883 B1 | 1/1999 |
| EP | 1070687 A1 | 1/2001 |
| EP | 1277714 A1 | 1/2003 |
| EP | 1588995 A1 | 10/2005 |
| EP | 1741685 A1 | 1/2007 |
| EP | 1741687 A1 | 1/2007 |
| EP | 2158956 A1 | 3/2010 |

OTHER PUBLICATIONS

International Search Report issued in PCT/EP2012/073003, mailed Dec. 11, 2012.
European Search Report issued in EP11190377, Jun. 8, 2012.

* cited by examiner

*Primary Examiner* — Amber R Orlando
(74) *Attorney, Agent, or Firm* — Sack IP Law P.C.; Alan M. Sack; Kimberley Elcess

(57) ABSTRACT

The present invention relates to a porous alpha-SiC-containing shaped body with a gas-permeable, open-pored pore structure comprising platelet-shaped crystallites which are connected to form an interconnected, continuous skeletal structure, wherein the skeletal structure consists of more than 80 wt.-% alpha-SiC, relative to the total weight of SiC, a process for producing same and its use as a filter component.

10 Claims, 11 Drawing Sheets

XP090407_0012  2009-07-29  x1.0k  100 um
Cross section, channel wall

Maximum temperature: 1450°C, 4 hours' residence time

Maximum temperature: 1850°C, 20 minutes' residence time

Maximum temperature: 1950°C, 20 minutes' residence time

Maximum temperature: 2000°C, 20 minutes' residence time

Maximum temperature: 1450°C, 4 hours' residence time

Maximum temperature: 1950°C, 20 minutes' residence time

| Embodiment example 2B | Comparison example |
|---|---|
| Figure 18a: | Figure 18d: |
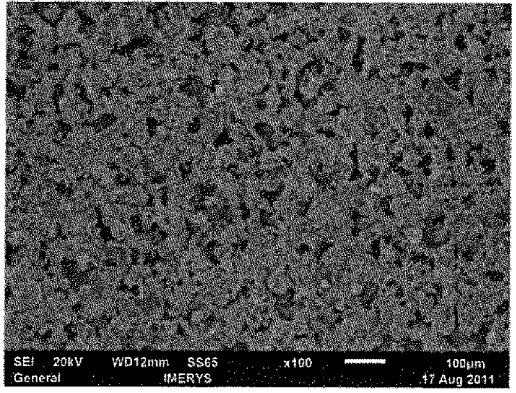 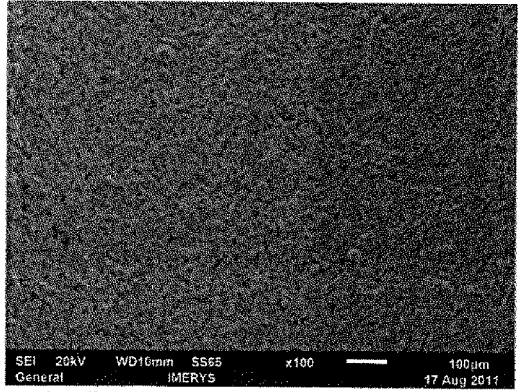
View of channel wall
Figure 18b: | Figure 18e:
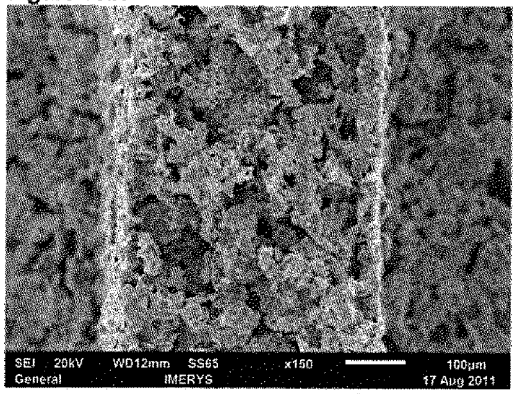 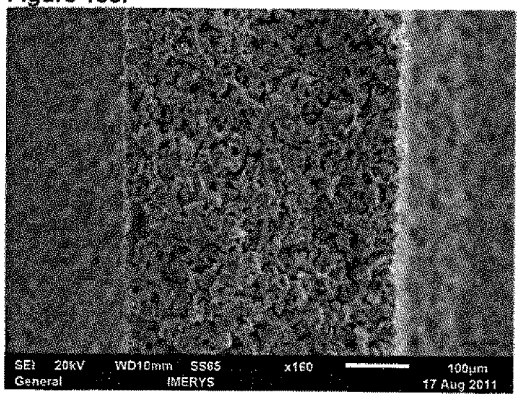
View of channel cross-section (fracture pattern)
Figure 18c: | Figure 18f:
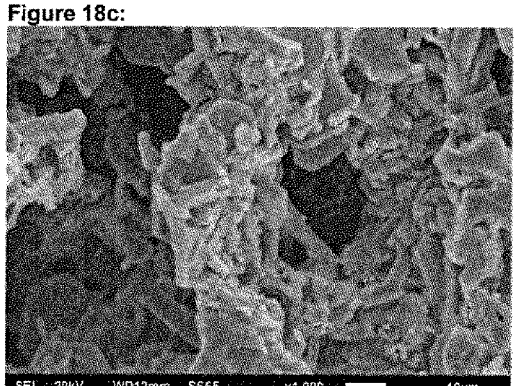 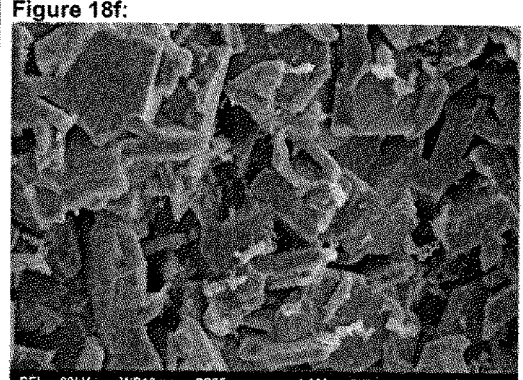
Magnified image of channel cross-section (fracture pattern)

POROUS ALPHA-SIC-CONTAINING SHAPED BODY HAVING A CONTIGUOUS OPEN PORE STRUCTURE

The present invention relates to a porous alpha-SiC-containing shaped body with a gas-permeable, open-pored microstructure, a process for producing same, and its use as filter component and catalyst support.

Filters are used, for example, in order to reduce the proportion of soot in the exhaust gas of a diesel engine. Furthermore, filters can be coated with catalyst in order both to support the combustion of the soot and to oxidize residual hydrocarbons and carbon monoxide. Furthermore, through corresponding catalysts it is possible to reduce the emission of nitrogen oxides.

Filters for exhaust gas aftertreatment can be classified into open and closed systems. The filtration power of closed systems is significantly higher as a rule and achieves up to 99.9%.

Closed systems are also called wall-flow filters. The exhaust gas is guided through the porous walls of the filter material—also called the substrate—and thereby cleaned of soot particles. This is achieved by alternately sealing the channels in honeycombed structures. A back pressure is generated by the friction losses during the flow through the channels and in particular the channel walls. This reduces the engine's power.

The back pressure depends on the geometry of the filter and of the channels, the open surface against which flow is directed, the permeability of the walls and the thickness of the walls. The build-up of a soot layer and/or ash deposits on and/or in the filter wall also increase the back pressure.

The permeability of the channel walls is determined by the microstructure of the substrate material, in particular the pore-size distribution as well as the arrangement of the pores and the porosity.

Ceramic materials are predominantly used for wall-flow filters. These are, in particular, silicon carbide (SiC), cordierite or aluminum titanate, or mullite. The ceramics differ with respect to thermal and chemical stability, thermal expansion and production costs.

Materials with lower coefficients of thermal expansion, such as cordierite or aluminum titanate, usually also have a lower thermal conductivity, which can lead to high thermal gradients during the regeneration. Aluminum titanate additionally has a low mechanical stability, which limits the possibilities for increasing the porosity. In the case of cordierite, to make matters worse, in particular ash deposits lead to a reduction in the thermal stability.

Mullite has a very high coefficient of thermal expansion and at the same time a low thermal conductivity, which can easily lead to supercritical stresses and thus to cracking in the case of temperature gradients such as can arise during the combustion of soot.

With respect to mechanical, thermal and chemical stability, SiC has the best properties for use as a wall-flow filter. Due to the greater thermal expansion, however, technically relevant filters made of SiC with sizes greater than 150 mm cannot be used as monoliths. The filters are preferably assembled from smaller segments, wherein the individual segments are permanently connected to each other by means of a high-temperature-stable ceramic adhesive. Thermal stresses that occur can be compensated for by the adhesive layer here and preferably do not lead to a component failure.

There are various variants for the production of substrates based on SiC.

A process for producing recrystallized SiC (R—SiC) is described for example in EP 0 336 883 B1, in which multimodal particle distributions of SiC are used. The size distribution of the particles used during the shaping determines the porosity, which can furthermore be increased by the use of pore formers. At temperatures above 2000° C., the fine particle fraction sublimes and recondenses and binds the coarser particles, which results in a stable structure. The porosity reduces only slightly during the temperature step.

A process for producing silicon-bonded SiC (SiSiC) is described for example in EP 1 277 714 A1, in which SiC grains are firmly connected to each other by fine silicon drops. During the shaping the size distribution of the particles used likewise determines the porosity, which can furthermore be increased by the use of pore formers. The porosity reduces only slightly during the temperature step.

A process for producing liquid phase sintered SiC, in which a liquid phase which connects the SiC particles to each other is formed by the addition of additives, is described for example in DE 197 27 115 C2.

A process for producing ceramically bonded SiC is described for example in EP 1 070 687 A1, in which the SiC particles are connected to each other using an oxide ceramic material.

Both in the production of ceramically bonded SiC and in the production of liquid phase sintered SiC, during the shaping the size distribution of the particles used determines the porosity, which can be increased by the use of pore formers. The proportion of ceramic binder phase likewise influences the porosity, which reduces only slightly during the sintering step.

A process for producing reaction-bonded SiC is described for example in the documents EP 0 796 830 A1, EP 1 741 687 A1, U.S. Pat. No. 7,648,932 B2 and U.S. Pat. No. 7,867,313 B2, wherein silicon and carbon are converted into SiC at a temperature preferably above the melting point of silicon. The increase in density during the formation of the reaction product simultaneously increases the porosity. By the addition of alloy elements which reduce the melting point, the conversion of silicon and carbon into SiC can take place at reduced temperatures, below the melting point of silicon.

A disadvantage of the known SiC substrates is that they usually only have a porosity of at most 50-52 vol.-%, relative to the total volume of the substrate. This applies in particular to recrystallized SiC as well as to foreign-phase-bonded SiC.

In EP 1 588 995 A1, for example, the use of pore formers to set a higher porosity is suggested. However, with an increasing proportion of pore formers, the mechanical stability decreases and the degree of filtration reduces. Problems also arise in the production of the substrates, as for example the recrystallization processes in the case of R—SiC are made difficult. Furthermore, cracks form to an increased extent in the burning-off of the pore former.

The pore size and thus also the back pressure of the substrate material can likewise be achieved by the selection of the primary particle size and by the use of different particle fractions.

In EP 0 796 830 A1 a process is described in which a pore growth is achieved by heating above 2000° C. A shaped body produced according to EP 0 796 830 A1, however, has a high wall thickness at 1.25 mm±0.5 mm.

Substrates with high filtration control and low increase in back pressure under soot loading are also produced in which the degree of filtration is set via the application of a membrane with small pore diameters to a substrate with a set porosity. This procedure is described for example in EP 2 158 956 A1.

Properties such as soot mass limit, catalyst absorption capacity and mechanical stability can thus be set via the porosity of the substrate independently of the degree of filtration, as this is set by the membrane. However, as the method makes the application of a membrane necessary, the method is laborious, error-prone and expensive.

In U.S. Pat. No. 3,097,930, a highly porous substrate is obtained by impregnating a polymer foam with a SiC slip, followed by drying and double sintering at 1900° C. to 2300° C., in which the polymer is burned off.

Alternatively, ceramic particles can be incorporated into the polymer foam during the foam formation, wherein the ceramic particles are converted into an open-pored ceramic by burning-off of the foam and subsequent ceramization reactions, as is described for example in U.S. Pat. No. 3,833,386, U.S. Pat. No. 3,175,918 or U.S. Pat. No. 3,345,440. Such bodies have a skeletal structure with a porosity of up to 90%. Although this brings about a high gas permeability, it does so with a very low mechanical strength. Moreover, the pores have a diameter greater than 100 μm, whereby a poorer filtration power is obtained. Small pores, on the other hand, are very difficult to produce due to the expansion behavior of the polymer as well as a homogeneous dispersion, as small pores tend to be closed.

A further process for producing a SiC filter with good gas permeability and low density and thus high porosity is described in U.S. Pat. No. 4,777,152. However, for this method beta-SiC with a small particle size must be used as raw material. Powdered beta-SiC is difficult to produce and therefore expensive. Moreover, powdered beta-SiC has, like alpha-SiC, strongly abrasive properties, with the result that molds are subject to significant wear during the production of honeycombs for the filters.

With reaction-formed SiC, as produced according to the method described in EP 1 741 687 A1, mechanically stable, highly porous substrates which have a porosity of >50 vol.-% can be obtained with very good filtration power at low temperatures. However, these disadvantageously have a large drop in pressure due to the special microstructure. However, for diesel engines a back pressure that is as low as possible is necessary in order to impair the engine's power as little as possible.

The porosity and pore-size distribution in the case of grain ceramics with SiC as starting material is determined by the particle-size distribution of the starting material as well as by the proportion of optional pore formers and/or binders. Neighboring particles are connected to each other and form a typical particle network, wherein individual particles can be identified in a scanning electron microscope (SEM for short) photograph.

Reaction-formed SiC, on the other hand, has a continuous three-dimensional framework structure, which contains discrete SiC particles not connected via a binder phase. Rather, a continuous framework of SiC is present. The continuous SiC framework has crystalline-looking areas in parts and amorphous-looking areas in parts, which do not have any visible grain boundaries.

One special feature of the reaction-formed SiC is thus its microstructure, which differs significantly from that of a grain ceramic.

A further characteristic of reaction-formed SiC is that it can be produced at production temperatures below 1800° C., and is then present predominantly as beta-SiC. As no SiC is used as starting material in the production of reaction-formed SiC, the wear of the molds used in the production likewise significantly reduces. Moreover, compared with recrystallized SiC the temperatures during the high-temperature treatment are greatly reduced, which further significantly reduces the production costs.

The microstructure of reaction-formed SiC, which is represented for example in FIG. 1, is characterized by large primary pores, which are connected to each other by small openings in the pore walls. These small openings in the pore walls, which can also be called passage openings, lead to an interconnected open porosity of the SiC framework and definitively determine the degree of separation and permeability of the structure. High degrees of separation can thus be achieved even without the build-up of a soot layer and/or ash deposits on and/or in the filter wall. Due to this structure, however, a significantly higher back pressure is also obtained during use as a wall-flow filter compared with the produced grain ceramics, for example recrystallized SiC or foreign-phase-bonded SiC.

The pore walls of the primary pores can be thin films or membranes, which are to be assigned to the amorphous-looking areas.

By the use of larger starting particles and the use of pore formers, the porosity of the structure and the diameter of the primary pores can be increased in a targeted manner. However, as the passage openings are thereby scarcely influenced by the membranes which delineating the primary pores from each other, the effect on the back pressure is slight. Moreover, limits on the use of coarser starting powders are set due to the production process and the wall thickness of the filter channels. In addition, the mechanical stability of a shaped body decreases as the porosity increases irrespective of the use.

The object of the present invention is therefore to provide a porous SiC-containing shaped body with a high porosity and a simultaneously good mechanical stability and which has a definable pore structure.

The object of the present invention is furthermore to provide a filter component which is characterized at high open porosity by a low back pressure and a high degree of separation.

The object of the present invention is achieved by providing a porous alpha-SiC-containing shaped body with a gas-permeable, open-pored microstructure comprising platelet-shaped crystallites which are connected to form a three-dimensional interconnected, continuous skeletal structure, wherein the skeletal structure consists of more than 80 wt.-%, preferably more than 90 wt.-%, preferably more than 95 wt.-% alpha-SiC, relative to the total weight of SiC.

Further preferred embodiments of the shaped body according to the invention are described in the dependent claims.

The object of the present invention is further achieved by providing a process for producing a porous alpha-SiC-containing shaped body, wherein the process comprises the following steps,
a) providing a, preferably reaction-formed, porous beta-SiC-containing shaped body, and
b) heating the, preferably reaction-formed, porous beta-SiC-containing shaped body to a temperature from a range of from 1800° C. to 2500° C., preferably of from 1850° C. to 2050° C., further preferably of from 1900° C. to 1999° C., obtaining the porous alpha-SiC-containing shaped body.

Preferred embodiments of the process according to the invention are described in the dependent claims.

The object of the present invention is further achieved by providing a filter comprising at least one porous alpha-SiC-containing shaped body, wherein the porous alpha-SiC-containing shaped body is formed as a honeycomb filter element in which the inflow and outflow openings of the flow-through channels are sealed alternately.

A preferred embodiment of the filter according to the invention is described herein.

The inventors surprisingly found that by temperature treatment of a, preferably reaction-formed, porous beta-SiC-containing shaped body, provided in step a) of the process according to the invention, at temperatures from a range of from 1800° C. to 1999° C. with a residence time of a few hours, and in a range of from 2000° C. to 2500° C. with a residence time of less than an hour down to a few minutes, the average diameter of the pore passage openings can be increased in a targeted manner and thus the build-up of back pressure during use as a wall-flow filter can be reduced significantly and in a targeted manner.

Suitable processes for producing the, preferably reaction-formed, porous beta-SiC-containing shaped body, provided in step a) of the process according to the invention, are described for example in documents EP 1 741 685 A1, U.S. Pat. No. 7,648,932 B2 and U.S. Pat. No. 7,867,313 B2, the content of which is hereby incorporated by reference.

The porous beta-SiC-containing shaped body provided in step a) of the process according to the invention is preferably a reaction-formed porous beta-SiC-containing shaped body which has been produced by reaction forming at 1300° C. to 1750° C.

In a preferred embodiment, the, preferably reaction-formed, porous beta-SiC-containing shaped body provided in step a) is obtained by extrusion of a silicon- and carbon-containing material or infiltration of a carbon-containing material with a silicon-containing melt.

In a further preferred embodiment, the, preferably reaction-formed, porous beta-SiC-containing shaped body provided in step a) is obtained by a process which comprises the following steps:

a1) shaping a green body from a mixture with or of carbon-containing particles and silicon-containing particles, which in each case preferably do not comprise any SiC, and at least one, preferably carbonizable, binder, as well as optionally at least one further additive, a2) drying the shaped green body, a3) debindering the dry green body under oxygen exclusion, preferably under protective gas, and a4) heating the debindered green body under oxygen exclusion, preferably under protective gas, to a temperature from a range of from 1300° C. to 1750° C. for a duration of at least ½ hour, obtaining the porous beta-SiC-containing shaped body.

By the term "silicon-containing" within the meaning of the invention is meant substances which comprise elemental silicon or silicon compounds, but preferably do not contain any silicon carbide.

Any Si modification, for example α, β, δ or γ-silicon, can be used as elemental silicon. Organic and/or inorganic silicon compounds can be used. Polymers which contain Si in their basic structural units, such as for example siloxanes, silsesquioxanes, polysilanes, polysiloxanes or silicon sols, such as for example tetraethoxysilane (TEOS) are preferably used as organic silicon compounds. Silicides, for example $TiS_2$, $CrSi_2$, $FeSi$ and/or $FeSi_2$, are preferably used as inorganic silicon compounds.

Metallic silicon powder or metallic alloys in powder form which contain silicon are preferably used.

By the term "carbon-containing" within the meaning of the invention is preferably meant substances which contain carbon in the graphite modification or consist thereof, but preferably do not contain any silicon carbide.

Carbons which have a very high purity are preferably used. By this is preferably meant a carbon content of at least 90 wt.-%, preferably of at least 95 wt.-%, in each case relative to the total weight of the carbon used.

Carbon-containing particles, which are also called powdered carbons below, are preferably selected from the group consisting of soot, graphite, carbonized resins, carbonized starches and mixtures thereof. Graphite is preferably used. The conversion of silicon and/or the silicon-containing material particularly preferably takes place with graphite which is bonded via a carbonized starch.

Suitable additives are for example surfactants, waxes, plasticizers and/or solvents. These additives can for example serve as extrusion additives and bring about an improved sliding capacity of the particles relative to each other and lead to a homogeneous distribution of all constituents during the extrusion.

Pore formers such as powdered polymers, starch powders or cellulose can be used as additives to increase porosity.

In a further preferred embodiment, the, preferably reaction-formed, porous beta-SiC-containing shaped body provided in step a) is obtained without the use of a pore former.

At least one carbonizable starch, preferably carbonizable modified starch, is preferably used as binder, preferably carbonizable binder. On the one hand, the starch acts as binder for the carbon-containing particles and, on the other hand, as it is converted into a so-called glassy carbon through pyrolysis, it likewise reacts with free silicon to form SiC. Therefore, for the stability after debindering and for the stability in the porous shaped body, it is advantageous to use at least one carbonizable starch, preferably carbonizable modified starch.

A modified starch is preferably used which splits off water from its base molecule starting from approx. 150° C. until only carbon remains. After pyrolysis at a temperature up to 950° C. under oxygen exclusion, preferably under protective gas atmosphere, the carbon yield is preferably approx. 20 wt.-%, relative to the quantity of starch used.

For example, the at least one carbonizable modified starch is selected from the group which consists of oxidized starch, acetylated starch, acetylated oxidized starch, enzymatically modified starch and mixtures thereof.

By "debindering" or also pyrolysis is meant the pyrolytic decomposition of the binders and other additives under oxygen exclusion, which can also be called coking process or carbonization process.

Without the at least one carbonizable binder, preferably carbonizable starch, further preferably carbonizable modified starch, the silicon- and carbon-containing particles are only present in a very weakly bonded framework in the shaped body.

By the use of at least one carbonizable binder, preferably at least one carbonizable, preferably modified, starch, the carbon-containing particles and the silicon particles are bonded in a stable shaped body after the debindering via the at least one carbonized binder, preferably carbonized starch. The bonding of carbon-containing particles via the at least one carbonized binder, preferably the at least one carbonized starch, further leads to an improvement in the stability of the SiC structure resulting from the siliconizing process.

The debindering of the dry green body takes place under oxygen exclusion, preferably under protective gas, preferably nitrogen.

Step a4) is preferably a siliconizing step. By the term "siliconize" within the meaning of the invention is meant the conversion of silicon- and carbon-containing material into SiC.

In a preferred embodiment, at least one, preferably powdered, element from main group 3 of the periodic table of the elements can also be added to the mixture in step a1). This at least one element is preferably boron or aluminum or a mixture thereof, particularly preferably aluminum. The at least one, preferably powdered, element from main group 3 of the periodic table of the elements in combination with the silicon preferably reduces the melting point of the silicon and additionally improves the wetting properties of the molten silicon on the carbon framework. This preferably achieves an improved reaction of the carbon framework with the silicon to form SiC even at temperatures of from 1300° C. up to the melting point of the silicon (1414° C.).

Step a4) preferably takes place at temperatures above the melting point of silicon, or above the melting point of the alloy of silicon and at least one element of main group 3 of the periodic table of the elements, preferably at a temperature between 1300° C. and 1750° C., further preferably between 1420° C. and 1700° C. The final temperature is preferably maintained for between 1 and 4 hours. The molten silicon is here drawn into the porous carbon framework and leaves behind cavities, which form the subsequent pores.

Preferably during addition of boron or aluminum or a mixture thereof, further preferably during addition of aluminum, large cavities are formed, so-called primary pores, which are connected to each other by smaller openings to form a continuously open pore structure. The siliconization in step a4) is thus not a conventional sintering procedure, but rather a chemical conversion into a new compound. The siliconization in step a4) is carried out under oxygen exclusion. Step a4) is preferably carried out under vacuum or argon atmosphere.

In principle it is also possible to produce the reaction-formed, porous beta-SiC-containing shaped body also via the following process steps:

a1') shaping a green body from a mixture with or of carbon-containing particles, which preferably do not comprise any SiC, and at least one binder, as well as optionally at least one further additive, a2') drying the shaped green body, a3') debindering the dry green body under oxygen exclusion, preferably under protective gas, and a4') infiltrating the debindered green body at a temperature from a range of from 1300° C. to 1750° C. with a silicon-containing melt, preferably silicon melt.

In a preferred embodiment, the silicon-containing melt, preferably silicon melt, used in step a4'), can furthermore contain at least one element from main group 3 of the periodic table of the elements, preferably boron or aluminum or mixtures thereof, further preferably aluminum.

Further preferably, the silicon-containing melt used in step a4') is a melt that consists of silicon and furthermore at least one element from main group 3 of the periodic table of the elements, preferably boron or aluminum or mixtures thereof, further preferably aluminum.

However, this variant is very laborious for industrial-scale production and is therefore to be given here only by way of example.

In an embodiment, the, preferably reaction-formed, porous beta-SiC-containing shaped body provided in step a) has a channel-containing structure which consists of a plurality of channels. The channel-containing structure of the, preferably reaction-formed, porous beta-SiC-containing shaped body preferably has channels which extend along the longitudinal axis of the shaped body and which are arranged substantially parallel to each other.

The cross-section of the channels is in general also called a cell.

The channels of the, preferably reaction-formed, porous beta-SiC-containing shaped body provided in step a) preferably have a square or polygonal cross-section, for example hexagonal or octagonal cross-section. The channel-containing structure of the, preferably reaction-formed, porous beta-SiC-containing shaped body provided in step a) preferably has a channel density which can be described in cpsi, wherein cpsi is the abbreviation of cells per square inch, which can be interpreted as channels or cells per square inch, and describes the number of channels, or cells, which lie in a cross-sectional area of one inch by one inch. The value of the channel density of the, preferably reaction-formed, porous beta-SiC-containing shaped body provided in step a) is preferably 50 to 600 cpsi, further preferably from 100 to 560 cpsi, further preferably from 180 to 500 cpsi, particularly preferably from 200 to 420 cpsi.

The channel wall thicknesses in the, preferably reaction-formed, porous beta-SiC-containing shaped body provided in step a) should be as thin as possible.

In a preferred embodiment, the channel walls of the, preferably reaction-formed, porous beta-SiC-containing shaped body provided in step a) have a wall thickness in the range of from 100 μm to 580 μm, preferably 120 to 500 μm, preferably 150 to 420 μm, preferably 180 to 400 μm, preferably 200 to 380, still more preferably 220 to 350 μm.

In an embodiment, the porous alpha-SiC-containing shaped body obtained in step b) has a channel-containing structure which consists of a plurality of channels. The channel-containing structure of the porous alpha-SiC-containing shaped body preferably has channels which extend along the longitudinal axis of the shaped body and which are arranged substantially parallel to each other.

The channels of the porous alpha-SiC-containing shaped body obtained in step b) preferably have a square or polygonal cross-section, for example hexagonal or octagonal cross-section. The channel-containing structure of the porous alpha-SiC-containing shaped body obtained in step b) preferably likewise has a channel density of from 50 to 600 cpsi, further preferably of from 100 to 560 cpsi, further preferably of from 180 to 500 cpsi, particularly preferably of from 200 to 420 cpsi.

In a preferred embodiment, the channel walls of the porous alpha-SiC-containing shaped body obtained in step b) have a wall thickness in the range of from 100 μm to 580 μm, preferably 120 to 500 μm, preferably 150 to 420 μm, preferably 180 to 400 μm, preferably 200 to 380, still more preferably 220 to 350 μm.

In fine-celled honeycomb structures, as used in the exhaust gas aftertreatment of diesel engines, the channel wall thickness appertaining to the respective cell density plays a decisive role when it comes to the back pressure of the filter.

The back pressure in a through-flow test for two filters which are constructed in each case from 9 individual segments and which both have a cell density of 300 cpsi, wherein in each case the inflow and outflow openings of the flow-through channels are sealed alternately, and the dimensions 5.66 inches in diameter and 10 inches in length and which have been produced from the same substrate can be regarded for illustration. Filter A has a channel wall thickness of 330 μm, filter B a channel wall thickness of 300 μm.

The porosity of the substrate in both filters was 56 vol.-%, relative to the external volume of the substrate, wherein the volume of open channels was not factored in, with an average pore size of 22 μm. The result is very clear: At a volumetric flow rate of 600 m³/hour, filter A has a back pressure of 63 mbar with a wall thickness of 330 μm. Filter B, with a wall thickness of 300 μm, at the same volumetric flow rate, lies at 50 mbar. These measurements were carried out at room temperature with the SF-1020 filter test bench from SuperFlow.

This result demonstrates that, for a given cell density, the associated channel wall thickness must not be too large. Experience has shown that the channel wall thickness in the case of 200 cpsi should be a maximum of 450 μm and in the case of 300 cpsi a maximum of 350 μm. For coarse-celled structures, the upper limits for the channel wall thicknesses lie at 600 μm in the case of 150 cpsi and at 800 μm in the case of 90 cpsi.

In step b) of the process according to the invention a, preferably reaction-formed, porous beta-SiC-containing shaped body is exposed to a temperature from a range of from 1800° C. to below 2500° C., preferably of from 1850° C. to 2050° C., further preferably of from 1900° C. to 1999° C., whereby a porous alpha-SiC-containing shaped body is obtained.

In step b), the beta-SiC of the, preferably reaction-formed, porous beta-SiC-containing shaped body provided in step a) is preferably at least 80 wt.-% converted into alpha-SiC, relative to the total weight of the beta-SiC provided in step a).

Step b) of the process according to the invention can preferably take place in-line subsequent to, i.e. immediately following, a siliconization step, preferably without intermediate cooling, in which a reaction-formed beta-SiC-containing shaped body is produced, transitionally, at a temperature from a range of from 1300° C. to 1750° C.

The average pore diameter and thus the drop in pressure of a filter constructed therefrom can be set in a targeted manner by the selection of the time-temperature profile in step b) of the process according to the invention.

By the average pore diameter, which can also be called the average pore size, is meant the average pore diameter which results from the median of the pore-size distribution relative to the pore volume. The pore diameter can also be called the pore size.

By "porosity" is meant the sum of the cavities in a solid, porous body, relative to its external volume. The sum of the cavities is stated in vol.-% relative to the external volume, which corresponds to 100 vol.-%. In the case of honeycomb bodies, the volume of the open channels is not to be factored in here.

By "open porosity" is meant the sum of the cavities which are connected to each other and/or to the environment in a solid, porous body, relative to its external volume.

By "gas-permeable, open porosity" is meant the sum of the cavities which are connected to each other and to the environment in a solid, porous body, relative to its external volume.

The average pore diameter is determined from the differential pore distribution. This is established together with the gas-permeable, open porosity using mercury porosimetry.

The mercury porosimetry or mercury intrusion is preferably carried out according to DIN 66133. A differential pore distribution of the shaped body investigated, given by the specific volume of the pore (mm³/g) as a function of the diameter of the pore (μm), is obtained as a result of such a measurement. Pores with a diameter greater than 3 nm as well as passage openings, arranged between the pores, which have a diameter greater than 3 nm can be measured with this method.

The, preferably reaction-formed, porous beta-SiC-containing shaped body provided in step a) preferably has pores with an average pore diameter, determined by means of mercury porosimetry, from a range of from 1 μm to 25 μm, preferably 3 to 20 μm, particular preferably between 5 to 15 μm.

The average pore diameter, determined by means of mercury porosimetry, of the, preferably reaction-formed, porous beta-SiC-containing shaped body provided in step a) preferably increases in step b) by a factor of 1.5 to 10, further preferably by a factor of 2 to 5.

The porous alpha-SiC-containing shaped body obtained in step b) preferably has an average pore diameter from a range of from 3 μm to 50 μm, further preferably of from 4 μm to 35 μm, still more preferably of from 10 μm to 30 μm, and a gas-permeable, open porosity from a range of from 45 vol.-% to 95 vol.-%, preferably of from 50 vol.-% to 85 vol.-%, preferably of from 54 vol.-% to 78 vol.-%, in each case relative to the total volume of the SiC shaped body.

The starting pore size can preferably be set via the grain distributions of the starting materials, for example of the carbon-containing particles and silicon-containing particles used and of the particles used of the at least one element from main group 3 of the periodic table of the elements, preferably boron, aluminum, further preferably aluminum. Finally, this at least one element from main group 3 of the periodic table of the elements can be set as described for example in EP 1 741 685 A1, U.S. Pat. No. 7,648,932 B2 and U.S. Pat. No. 7,867,313 B2.

In an embodiment, the silicon-containing particles have a grain size from a range of from 0.001 to 190 μm, and/or the carbon-containing particles have a grain size from a range of from 0.001 to 150 μm. In a first preferred embodiment, the silicon-containing particles have a grain size from a range of from 40 to 140 μm and a $d_{50}$ value of from 60 to 70 μm and/or the carbon-containing particles have a grain size from a range of from 0.001 to 65 μm and preferably a $d_{50}$ value of from 15 to 20 μm.

In a second preferred embodiment, the silicon-containing particles have a grain size from a range of from 0.001 to 75 μm and a $d_{50}$ value of from 18 to 25 μm and/or the carbon-containing particles have a grain size from a range of from 0.001 to 40 μm and preferably a $d_{50}$ value of from 8 to 15 μm.

For example, for a, preferably reaction-formed, porous beta-SiC-containing shaped body provided in step a) having pores in an average pore size in the range of from 8 to 15 μm, carbon-containing particles with a grain size in the range of from 15 to 20 μm and silicon-containing particles with a particle size in the range of from 40 to 140 μm and a $d_{50}$ value of from 60 to 70 μm are used.

The parameter $d_{50}$ as volumetric diameter is the size of a particle which is larger than 50 percent by volume of the particles contained in the sample overall.

In an embodiment, the porosity of the, preferably reaction-formed, porous beta-SiC-containing shaped body provided in step a) can be increased by removal of silicon which has not converted into SiC.

The silicon is preferably removed by chemical dissolution of silicon under the action of acid and/or alkali or accompanied by heating of the, preferably reaction-formed, porous beta-SiC-containing shaped body provided in step a) and by liquefaction and/or evaporation of silicon, wherein the removal of the liquefied and/or evaporated silicon is particularly preferably additionally supported by the application of negative pressure.

The silicon which is still free can also be dissolved out for example by evaporation of the silicon at a suitable temperature above the vapor temperature of the silicon, preferably at above 1400° C. In an embodiment, the evaporation of the silicon from the, preferably reaction-formed, porous beta-SiC-containing shaped body provided in step a) is carried out at temperatures between 1400° C. and 1700° C.

In a further embodiment, the porosity of the porous alpha-SiC-containing shaped body obtained in step b) can likewise be increased by removal of silicon which has not converted into SiC.

According to the invention, in step b) of the process according to the invention, the passage openings between the pores progressively widen, and a more open pore structure is obtained. A dissolution of thin boundary membranes of the pores can be seen as the cause of the opening of the pore passages, which preferably progresses with increasing temperature and residence time and opens the passages. The thin boundary membranes preferably dissolve as they have a larger specific surface area.

Through the increase in the diameter of the passage openings between the pores, a more open pore structure forms.

The whole process from the formation of the beta-SiC shaped body via the conversion into the alpha-SiC shaped body is represented schematically in FIG. 2. The whole process is divided into four phases: In phase I the conversion of silicon and carbon into SiC takes place; the beta-SiC shaped body forms. In phase II the conversion is completed. As the temperature approaches 1850° C. the conversion of beta-SiC into alpha-SiC begins. Phase III: in this phase the conversion of beta-SiC into alpha-SiC takes place completely and the pore passage openings widen. In this phase the pore opening widths can be set in a targeted manner via the temperature and residence time. Phase IV: the conversion into alpha-SiC is finished. Progressive crystal growth with conventional recrystallization now begins, i.e. small crystallites dissolve and become attached to the larger crystallites; very large pore passage openings form.

The average pore diameter measured by means of mercury porosimetry preferably increases due to the passage openings which are getting bigger, while the diameters of the primary pores themselves barely change, as represented schematically in FIG. 2. This preferably reduces the back pressure, wherein the filtration power, however, is barely, preferably is not, reduced.

The average pore diameter that arises, which can also be called pore opening diameter, is preferably determined by means of mercury porosimetry and preferably follows a characteristic course, which can be described by functions such as the error function $erf(x)$ or the arctangent $arctan(x)$, for the Phase III represented in FIG. 2 as a function of the maximum temperature during the residence time.

If, for example, the oven load as well as the temperature profile is determined inclusive of heating-up ramps and residence times, the desired pore diameter can be calculated approximately via one of these functions for a system with defined starting materials. The arctangent$(x)$ which can be used for the adaptation in the following equation (1) proved to be particularly suitable.

$$D_{Pore}(T) = D_0 + \frac{D_1}{\pi} \cdot \left\{ \frac{\pi}{2} + \tan^{-1}\left(\frac{T - T_0}{T_1}\right) \right\} \quad (1)$$

$D_0$ represents the pore diameter at the temperature at which the siliconization is finished, i.e. at 1700° C. $D_1$ represents the value by which the pore size can be maximally increased with a predetermined starting structure and a defined residence time.

$T_0$ is the inflection point of the function. The largest changes in the pore size depending on temperature fluctuations occur between $T_0-T_1$ and $T_0+T_1$. Above $T_0+T_1$ the pore openings become so large that the shell structure is lost. This range (represented as Phase IV in FIG. 2) leads to very large pore passage openings, which is interesting in specific uses with very large coating quantities.

The equation given above preferably serves as an aid in the process according to the invention for producing the porous honeycomb structures. When specifying all process parameters, this equation can be used in order to specify the desired temperature for setting a desired pore diameter. Furthermore, the maximum temperature gradients permitted in the furnace process can be calculated as a function of the maximum tolerance permitted in the pore size.

It has been shown that the duration of the residence time at the final temperature preferably has an influence on $T_0$ and $T_1$. Thus, if the residence time is extended, for example, the same effect can be achieved at a lower temperature.

The above-described Phase III in FIG. 2 is thus not a pore growth, as is described for example in document EP 0 796 830 A1 for temperatures above 2000° C., but rather a phase transition with recrystallization which is accompanied by a widening of the pore openings. The inventors have furthermore surprisingly found that this occurs even at temperatures of approximately 1800° C. and that the degree of widening of the pore openings can be set both via the selected final temperature and via the residence time.

The dissolution of the boundary membranes can be accompanied by a partial, preferably complete, conversion of beta-SiC into alpha-SiC. Through the recrystallization, the atoms of the boundary membranes or pore walls can be incorporated into the newly formed crystallites. These newly formed crystallites have a platelet-shaped structure.

Processes for producing reaction-formed SiC bodies in which the conversion is carried out in nitrogen are also described in the state of the art. An example of this is EP 0 796 830 A1.

In contrast to these processes, in the process according to the invention the conversion of silicon-containing particles and carbon-containing particles into SiC takes place under an inert gas atmosphere such as argon. Whereas in EP 0 796 830 A1, due to the nitrogen present, a nitridation of the silicon to form silicon nitride is first carried out, which is then converted into SiC above 1800° C., in the present process a predominantly beta-SiC-containing structure forms from approx. 1400° C. in the reaction under inert gas. It is doubtful whether a continuous beta-SiC framework occurs at all in a process under nitrogen, as at these high temperatures a mostly direct transition from silicon nitride to alpha-SiC could also occur, depending on the temperature control.

Irrespective of the temporary formation of beta-SiC, the respective reaction mechanisms forming the basis are fundamentally different, which also has a decisive effect on the microstructure that forms. Whereas the nitridation of silicon is a reaction between gaseous nitrogen and solid silicon (gas-solid reaction) or, after melting of the silicon, a reaction between gaseous nitrogen and liquid silicon (gas-liquid reaction), in the case of the reaction-formed SiC described here a reaction between the solid carbon and the molten silicon takes place (solid-liquid reaction).

The microstructures resulting from the reaction mechanisms are fundamentally different, as in the case of nitridation on the one hand additional nitrogen is incorporated into the structure—accompanied by increase in mass and volume—and on the other hand a solid, enclosing silicon nitride film, which impedes the flow of the molten silicon, also forms through an interfacial reaction.

In the case of the solid-liquid reaction of the process which forms the basis here, in contrast, the molten silicon can flow and leave behind the characteristic large pores, which constitute a decisive characteristic for the, preferably reaction-formed, porous beta-SiC-containing shaped body provided in step a) of the process according to the invention.

In the course of this reaction, the element from main group 3 of the periodic table of the elements, preferably boron or aluminum or mixtures thereof, particularly preferably aluminum, can also take on a decisive role, as it reduces the melting point of silicon, the silicon therefore already becomes liquid at lower temperatures and can be distributed in the carbon structure.

The reaction to form SiC preferably does not yet proceed so quickly, due to the lower temperature, with the result that the silicon also has more time to flow and be distributed.

The addition of the element from main group 3 of the periodic table of the elements, preferably boron or aluminum or mixtures thereof, particularly preferably aluminum, furthermore preferably reduces the wetting angle of contact of the silicon to carbon and makes possible a spreading of the silicon in the carbon framework. The characteristic cavity structure preferably forms first through the redistribution of the molten silicon, wherein the membranes between the large primary pores can be seen as evidence of a first reaction between the molten silicon and the amorphous, solid carbon of the pyrolyzed starch.

The element from main group 3 of the periodic table of the elements, preferably boron or aluminum or mixtures thereof, particularly preferably aluminum, thus also has a fundamentally different significance from that described in U.S. Pat. No. 4,777,152. While in this case the conversion of beta-SiC which had been used as original raw material in the form of SiC grains into alpha-SiC is made easier, it does not help to achieve the typical cavity structure of this invention. This is, as described above, only possible through the combination of reaction-formed SiC under inert gas atmosphere and the supporting use of an element from main group 3 of the periodic table of the elements, preferably boron or aluminum or mixtures thereof, particularly preferably aluminum. Via the other processes, in contrast, the typical microstructure of a grain ceramic is obtained, which does not have the microstructural advantages of the microstructure obtained here.

The crystallites newly formed in the conversion of beta-SiC to alpha-SiC, with a preferably platelet-shaped form, preferably have a length to thickness ratio of 5:1 or greater and consist of more than 80 wt.-%, preferably more than 90 wt.-%, preferably more than 95 wt.-%, alpha-SiC, in each case relative to the total weight of SiC.

The platelet-shaped crystallites preferably have a length between 0.1 μm and 100 μm, particularly preferably between 0.1 μm and 10 μm.

A further advantage of the newly formed structure is thus the fact that it is composed of platelet-shaped crystallites, which initially forms via a pure phase transition, i.e. a continuous three-dimensional, preferably non-sintered, SiC framework is still present.

The porous alpha-SiC-containing shaped body of the present invention, obtained in step b), preferably comprises a three-dimensional, continuous, alpha-SiC framework.

The alpha-SiC formed preferably also has here a typical platelet-shaped, hexagonal crystallite form, whereas in the reaction-formed beta-SiC as far as possible preferably no grains or grain boundaries are recognizable.

The porous alpha-SiC-containing shaped body with gas-permeable, open-pored pore structure is an inorganic, non-metallic, preferably ceramic shaped body.

The porous alpha-SiC-containing shaped body according to the invention preferably comprises SiC in a proportion of more than 80 wt.-%, preferably of more than 90 wt.-%, further preferably of more than 95 wt.-%, in each case relative to the total weight of the shaped body.

By a "three-dimensional, continuous, alpha-SiC framework", which can also be called "three-dimensional, continuous, alpha-SiC skeleton", within the meaning of the invention is meant an alpha-SiC structure which comprises alpha-SiC, which forms a solid, three-dimensional continuous structure without further binders.

The three-dimensional, continuous, alpha-SiC framework of the porous alpha-SiC-containing shaped body according to the invention preferably comprises alpha-SiC in a proportion of more than 80 wt.-%, preferably of more than 90 wt.-%, further preferably of more than 95 wt.-%, in each case relative to the total weight of the alpha-SiC framework of the shaped body.

In conventional, foreign-phase-bonded SiC structures, the SiC framework is bonded via a binder, for example molten silicon. The great advantage of a continuous SiC framework is that the shaped body is substantially more stable and more resistant to aggressive substances, such as for example car exhaust gases. The inventors thus surprisingly managed to prepare a porous, alpha-SiC-containing shaped body which has an excellent chemical and mechanical resistance.

It is known from the literature that for example the platelet-shaped crystallites of the hexagonal alpha-SiC has a good fracture behavior through crack deviation at the platelet-shaped planes. The new structure of the porous alpha-SiC-containing shaped body according to the invention thus preferably has a higher fracture toughness and thermal shock stability than a SiC shaped body with globular grain structure or a corresponding grain ceramic, which is important for example with regard to the use as a filter, preferably soot filter.

In a preferred embodiment, the alpha-SiC is present as hexagonal alpha-SiC and/or rhombohedral alpha-SiC, preferably hexagonal alpha-SiC.

Further preferably the alpha-SiC is at least partially present in 2H, 4H, 6H, 8H, 10H, 14H and/or 15R polytype.

In a further preferred embodiment of the porous alpha-SiC-containing shaped body according to the invention, the gas-permeable, open-pored pore structure of the shaped body has pores, the average pore diameter of which, which is preferably determined by means of mercury porosimetry, is greater than the size of the crystallites and the average thickness of the pore walls, which is constructed from the crystallites.

This is illustrated by the schematic representation in FIG. 2 and in particular the electron microscope photographs in FIG. 8a, in which the proportions of the pore walls which are constructed from the crystallites can easily be recognized in relation to the pores.

The average thickness of the pore walls and the comparison thereof to the average pore diameter can be determined for example using micro-computed tomography (Micro- CT). A further possibility is to produce polished sections and to make electron microscope images of these. Wall thicknesses and pore diameters can be measured and be analyzed and compared using statistical methods.

In a further preferred embodiment of the porous alpha-SiC-containing shaped body according to the invention, the gas-permeable, open-pored pore structure of the shaped body has pores with an average pore diameter, which is preferably determined by means of mercury porosimetry, from a range of from 3 μm to 50 μm, further preferably from 5 μm to 35 μm, and an open porosity from a range of from 45 vol.-% to 95 vol.-%, preferably from 50 vol.-% to 85 vol.-%, preferably from 54 vol.-% to 78 vol.-%, in each case relative to the total volume of the shaped body, wherein the continuously open-pored pore structure of the shaped body has pores the average pore diameter of which, which is preferably determined by means of mercury porosimetry, is greater than the size of the crystallites and the average thickness of the pore walls, which is constructed from the crystallites.

Beta-SiC is preferably converted partially to completely into alpha-SiC even at temperatures of approximately 1800° C. through the presence of at least one element from main group 3 of the periodic table of the elements, preferably boron or aluminum or mixtures thereof, further preferably aluminum. The phase transition preferably leads to the formation of platelet-shaped SiC crystallites which form a continuously interconnected structure.

Through the presence of at least one element from main group 3 of the periodic table of the elements, preferably boron or aluminum or mixtures thereof, further preferably aluminum, this phase transition takes place very quickly and is already finished, depending on the selected final temperatures, for example after 10 to 20 minutes.

The further growth of the alpha-SiC crystallites is preferably likewise supported through the presence of at least one element from main group 3 of the periodic table of the elements, preferably boron or aluminum or mixtures thereof, further preferably aluminum. Finally, this at least one element from main group 3 of the periodic table of the elements can be incorporated into the framework structure in the form of a ternary carbide.

In a further preferred embodiment the porous alpha-SiC-containing shaped body according to the invention furthermore comprises at least one ternary carbide of silicon, carbon and at least one element from main group 3 of the periodic table of the elements, preferably boron or aluminum or mixtures thereof, further preferably aluminum.

The at least one ternary carbide is preferably a carbide of the general empirical formula $Al_4C_3(SiC)_x$, wherein x means a whole number from 1 to 4, preferably 1 or 2, or a mixture thereof.

In a further preferred embodiment the at least one ternary carbide is a carbide of the formula $Al_4SiC_4$ or a carbide of the formula $Al_4Si_2C_5$ or a mixture thereof.

In a further preferred embodiment the porous alpha-SiC-containing shaped body according to the invention comprises the at least one ternary carbide in a proportion of from 0.1 wt.-% to 10 wt.-%, preferably of from 0.25 wt.-% to 8 wt.-%, preferably of from 0.5 wt.-% to 5 wt.-%, in each case relative to the total weight of SiC.

The at least one ternary carbide of silicon, carbon and at least one element from main group 3 of the periodic table of the elements, preferably boron or aluminum or mixtures thereof, further preferably aluminum, preferably likewise has a platelet-shaped crystal structure.

Which carbides or mixtures thereof form also depends on the local temperature and composition of the atmosphere. For example, the carbide of the formula $Al_4Si_2C_5$ is preferably formed in the presence of nitrogen.

Nitrogen can for example be included as additional component or else via the gas phase in the case of pyrolysis in nitrogen.

In the Al—C—N system it is also possible that phases of the type $Al_4C_3*xAlN$, such as for example $Al_5C_3N$, $Al_6C_3N_2$, $Al_7C_3N_3$ or $Al_8C_3N_4$, form, depending on the local temperature and composition conditions.

Should impurities of oxygen additionally still be present, phases of the $Al_4C_3$—$Al_2O_3$ system, such as for example $Al_2OC$, $Al_4O_4C$, $2Al_2O_3*xAlN$, or also phases of the Al—C—O—N system or the Si—Al—C.N—O system are also possible to a small extent. A clear identification of the phases is often only possible with difficulty here, as they are isomorphically constructed or can also be formed amorphous. The isomorphic incorporation of other elements as well as the incorporation of elements in other phases due to a certain solubility is also possible.

Oxygen can, for example, be included via the gas phase in the case of pyrolysis in technical nitrogen or be brought into the system via the oxide film usual on metals. The process additives used can also have nitrogen and oxygen in their molecular structure.

In a further preferred embodiment, the porous alpha-SiC-containing shaped body according to the invention thus furthermore comprises nitrogen and/or oxygen atoms in an amount-of-substance fraction of less than 5 at.-%, further preferably of less than 3 at.-%, in each case relative to the sum of all constituents of the shaped body.

It is furthermore preferred that, after its production in an oxygen-containing atmosphere at temperatures above 900° C., the porous alpha-SiC-containing shaped body according to the invention is oxidized, whereby a very thin $SiO_2$ layer is generated on the SiC surface.

If ternary carbides with aluminum have formed, a further advantage arises in that not just a thin $SiO_2$ layer can thus be generated on the SiC through downstream oxidation, but a $SiO_2$ mullite layer. The chemical resistance of the SiC framework is thereby preferably improved again.

Furthermore, in step b) of the process according to the invention, a loss of weight due to the evaporation of silicon-containing and/or aluminum-containing phases can occur.

In the case of long residence times and high temperatures, a mild shrinkage process can occur.

According to a preferred embodiment, a porous alpha-SiC-containing shaped body according to the invention is used as a filter, preferably a particulate filter, wherein the porous alpha-SiC-containing shaped body is than formed as a honeycomb filter element. According to a preferred variant, the channels are not continuous. The channels in this variant are preferably sealed alternately. This means that the channels which lie substantially parallel to each other are sealed alternately at one end or at the other end.

This makes it possible to use a porous alpha-SiC-containing shaped body designed in such a way as a wall-flow filter, wherein the medium to be filtered passes through the wall from one channel over into the neighboring channel and any particulate impurities present are held back. In an advantageous embodiment, the porous alpha-SiC-containing shaped body has channels and porous channel walls.

The porous alpha-SiC-containing shaped body preferably has a rectangular-box or cylindrical shaping. The shaped bodies can also have a polygonal cross-section, for example a hexagonal or octagonal cross-section. The porous alpha- SiC-containing shaped body preferably has channels which extend along the longitudinal axis of the shaped body and which are arranged substantially parallel to each other.

A filter according to the invention, preferably a soot particulate filter, comprises at least one porous alpha-SiC-containing shaped body according to the invention, wherein the shaped body is formed as a honeycomb filter element in which the inflow and outflow openings of the flow-through channels are sealed alternately.

The filter preferably consists of several porous alpha-SiC-containing shaped bodies according to the invention, wherein these are formed as honeycomb filter elements in which the inflow and outflow openings of the flow-through channels are sealed alternately, which can be connected or are connected by an adhesive. By the term adhesive within the meaning of the invention is meant a ceramic-based material which cures chemically or hydraulically and which is temperature-resistant up to at least 1000° C., preferably 1600° C.

A porous alpha-SiC-containing shaped body according to the invention or a filter produced therefrom according to the invention, preferably a soot particulate filter, can for example be arranged in an exhaust system of a motor vehicle or an exhaust gas treatment system of a combustion engine.

Furthermore, a porous alpha-SiC-containing shaped body according to the invention or a filter produced therefrom according to the invention, preferably a soot particulate filter, is suitable to hold back very fine particles from a combustion process, which particles increasingly represent a burden on the environment.

The characteristic pore distribution of the shaped body according to the invention is advantageous for effective soot filtration in an exhaust system of a diesel engine. If the pores are too large, the soot particles are thus increasingly deposited in the wall structure and a depth filter effect occurs, i.e. the soot particles cause a marked increase in the drop in pressure in the wall. In the porous shaped body according to the invention, the pores are so fine, with the result that the soot is deposited in the form of a porous layer on the surface of the filter. In this case, the increase in the drop in pressure through this porous surface layer is lower than with the depth filter effect.

For example, a round filter according to the invention with a diameter of 5.66 inches and a length of 7 inches which is constructed from 9 filter segments with a cellularity of 300 cpsi, a cell wall thickness of 12 milli-inches (mil), a porosity of 60 vol.-%, relative to the external volume of the honeycomb filter, wherein the volume of open channels was not factored in, and an average pore diameter of 21 μm, at an exhaust gas mass flow rate of 250 kg/h and a temperature of 240° C., has a back pressure of 20 mbar. With a loading with soot of 5 g/L, this increases to a value of 68 mbar. A filter from the state of the art, for example silicon-bonded SiC in analogy to EP 1 277 714 A1, which has the same dimensions and is likewise constructed from 16 filter segments with a cellularity of 300 cpsi, a cell wall thickness of 12 mil, a porosity of 52 vol.-%, relative to the external volume of the honeycomb filter, wherein the volume of open channels was not factored in, and an average pore diameter of 15 μm, at an exhaust gas mass flow rate of 250 kg/h and a temperature of 240° C., likewise has a back pressure of 20 mbar. With a loading with soot of 5 g/L, however, this increases to a value of 100 mbar. The filter according to the invention thus has a much smaller depth filter effect than the filter from the state of the art.

In a further preferred embodiment of the filter, a porous alpha-SiC-containing shaped body according to the invention contains at least one oxidation step in which a thin $SiO_2$ or mullite layer which increases the chemical and mechanical stability is formed on the crystallite structure.

In a further preferred embodiment of the filter, a porous alpha-SiC-containing shaped body according to the invention contains at least one catalytically active coating.

A porous alpha-SiC-containing shaped body according to the invention or a filter produced therefrom according to the invention can thus also be used as a catalyst support structure as well as corresponding catalyst systems.

Suitable catalytically active coatings to improve soot oxidation and to reduce nitrogen oxides as well as combinations thereof are known from the state of the art.

The invention is explained below using examples, without being limited thereto.

FIGURES

FIG. 1 shows an electron microscope 1000× magnification of a shaped body made of reaction-bonded beta-SiC.

FIG. 2 schematically shows the opening of the passage openings at increasing temperature. The whole process is divided into four phases: In phase I the conversion of silicon and carbon into SiC takes place; the beta-SiC shaped body forms. In phase II the conversion is completed. As the temperature approaches 1850° C. the conversion of beta-SiC into alpha SiC begins. Phase III: In this phase the conversion of beta-SiC into alpha-SiC takes place completely and the pore passage openings widen. In this phase the pore opening widths can be set in a targeted manner via the temperature and residence time, Phase IV: the conversion into alpha-SiC is finished. Progressive crystal growth with conventional recrystallization now begins, i.e. small crystallites dissolve and become attached to the large crystallites; very large pore passage openings form.

FIG. 3 shows an electron microscope magnification of a SiC shaped body from embodiment example 1 after heating to a maximum temperature of 1450° C. for 4 hours under argon atmosphere. FIG. 3a shows the cross-section of a channel wall at 150× magnification. FIG. 3b shows a view of a channel wall at 100× magnification.

FIG. 4 shows an electron microscope magnification of a SiC shaped body from embodiment example 1 after heating to a maximum temperature of 1850° C. for 20 minutes under argon atmosphere. FIG. 4a shows the cross-section of a channel wall at 150× magnification. FIG. 4b shows a view of a channel wall at 100× magnification.

FIG. 5 shows an electron microscope magnification of a SiC shaped body from embodiment example 1 after heating to a maximum temperature of 1950° C. for 20 minutes under argon atmosphere. FIG. 5a shows the cross-section of a channel wall at 150× magnification. FIG. 5b shows a view of a channel wall at 100× magnification.

FIG. 6 shows an electron microscope magnification of a SiC shaped body from embodiment example 1 after heating to a maximum temperature of 2000° C. for 20 minutes under argon atmosphere. FIG. 6a shows the cross-section of a channel wall at 150× magnification. FIG. 6b shows a view of a channel wall at 100× magnification.

Figure 9:
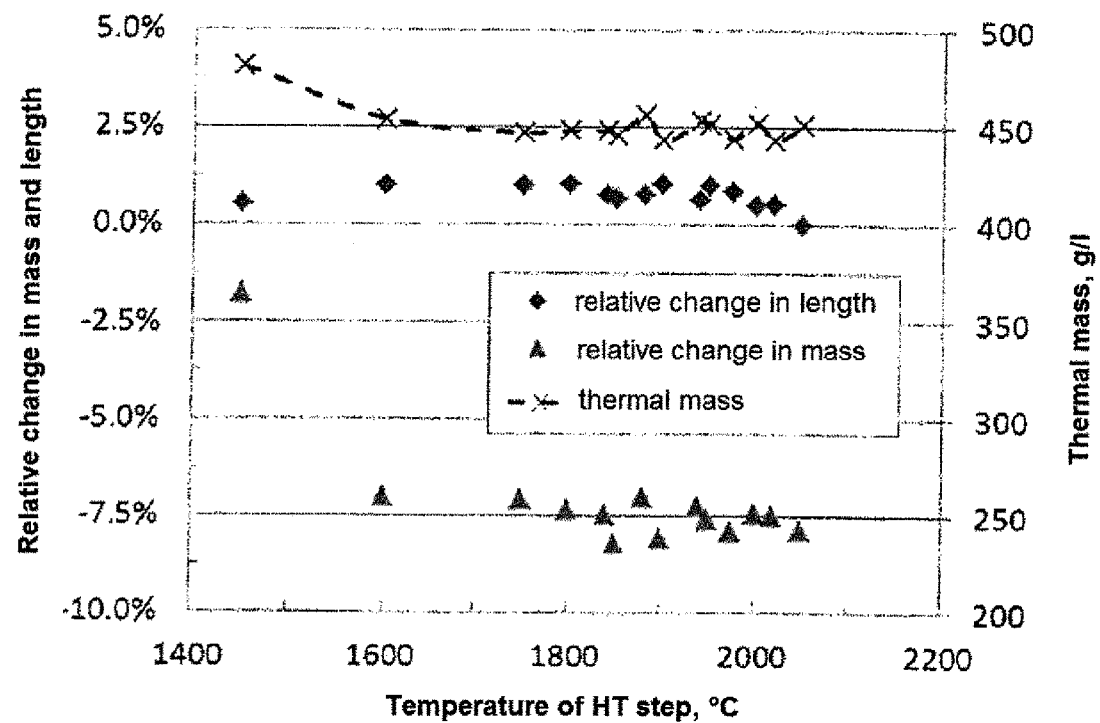

FIG. 9 shows the mass loss and the change in length, in each case given in % relative to the mass or length, respectively, of the reaction-formed beta-SiC-containing shaped body before the heat treatment, as well as the thermal mass calculated from the external dimensions (length*width*height) and the mass of the honeycombs for different maximum temperatures, in each case given as temperature of the HT step, of the porous shaped bodies produced in embodiment example 1.

Figure 10:
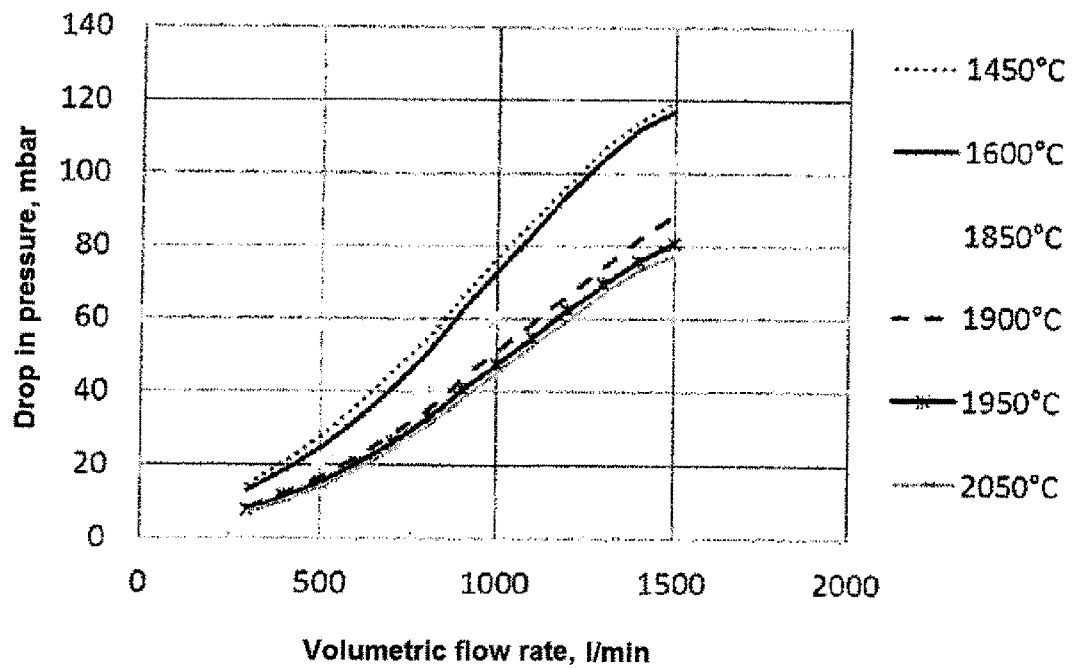

FIG. 10 shows the pressure loss curves without soot loading, at increasing through-flow rates, of the alternately sealed honeycomb filters (width and height of 35 mm, length 178 mm) produced in embodiment example 1 at different maximum temperatures (1450° C., 1600° C., 1850° C., 1900° C., 1950° C. or 2050° C.).

Figure 11:
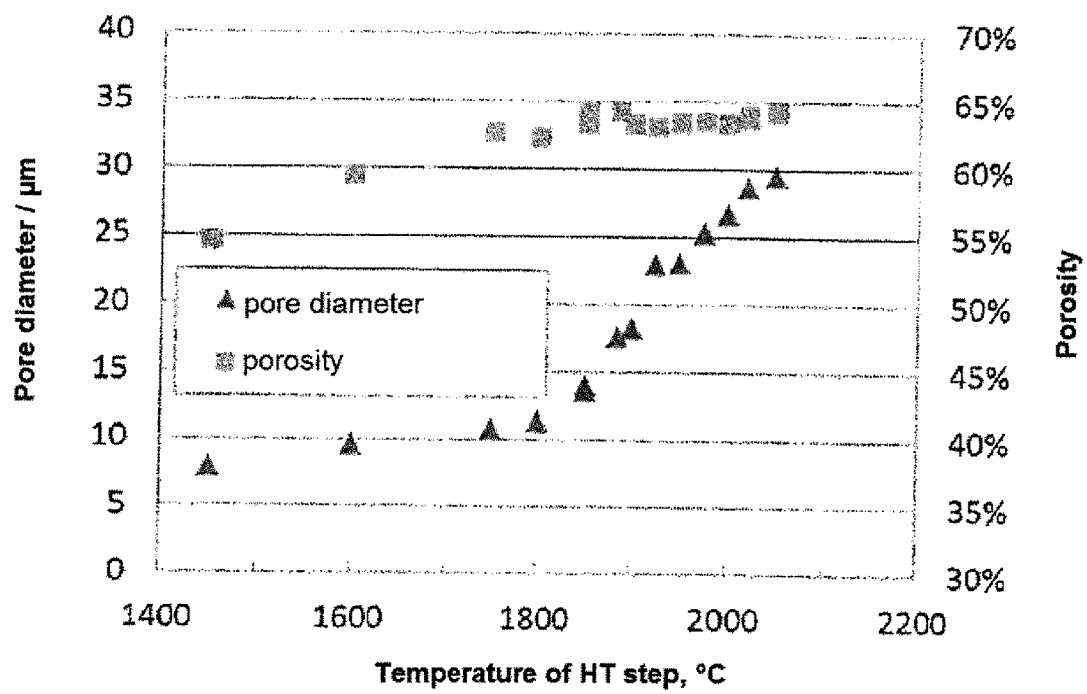

FIG. 11 shows the porosities in vol.-%, determined by means of mercury porosimetry, in each case relative to the external volume of the honeycomb filter, wherein the volume of open channels was not factored in, and average pore diameters in μm of the alternately sealed honeycomb filters (width and height of 35 mm, length 178 mm) produced in embodiment example 1 at different maximum temperatures, in each case given as temperature of the HT step.

Figure 12:
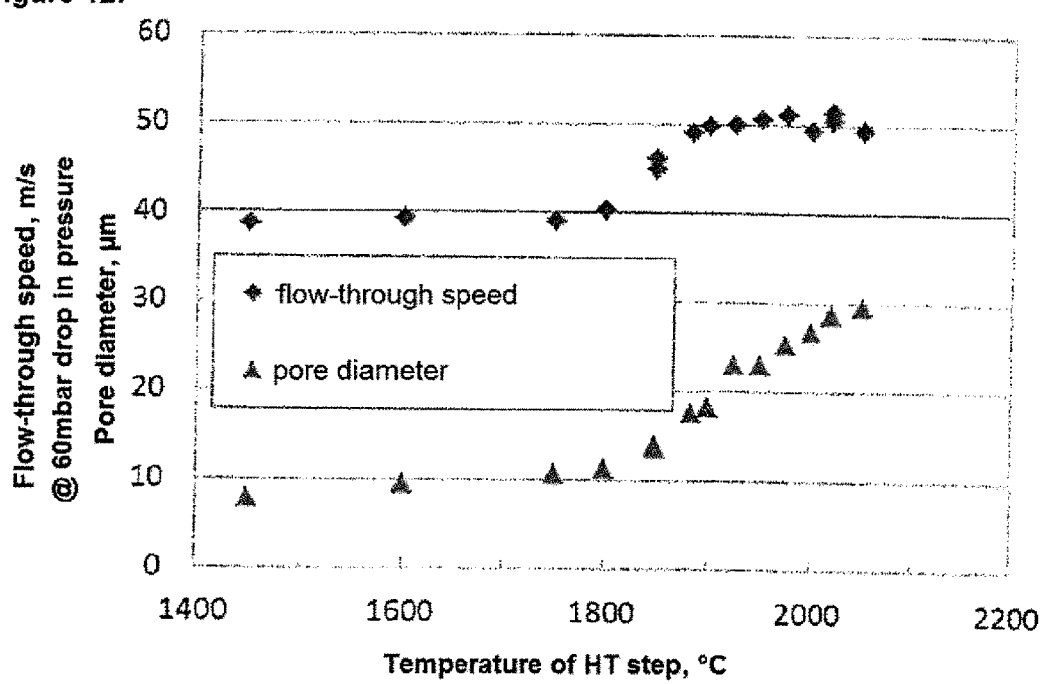

FIG. 12 shows the average pore diameters in μm and the flow-through speed through the channel wall in m/s, at a constant drop in pressure of 60 mbar, of the alternately sealed honeycomb filters (width and height of 35 mm, length 178 mm) produced in embodiment example 1 at different maximum temperatures, in each case given as temperature of the HT step.

Figure 13:
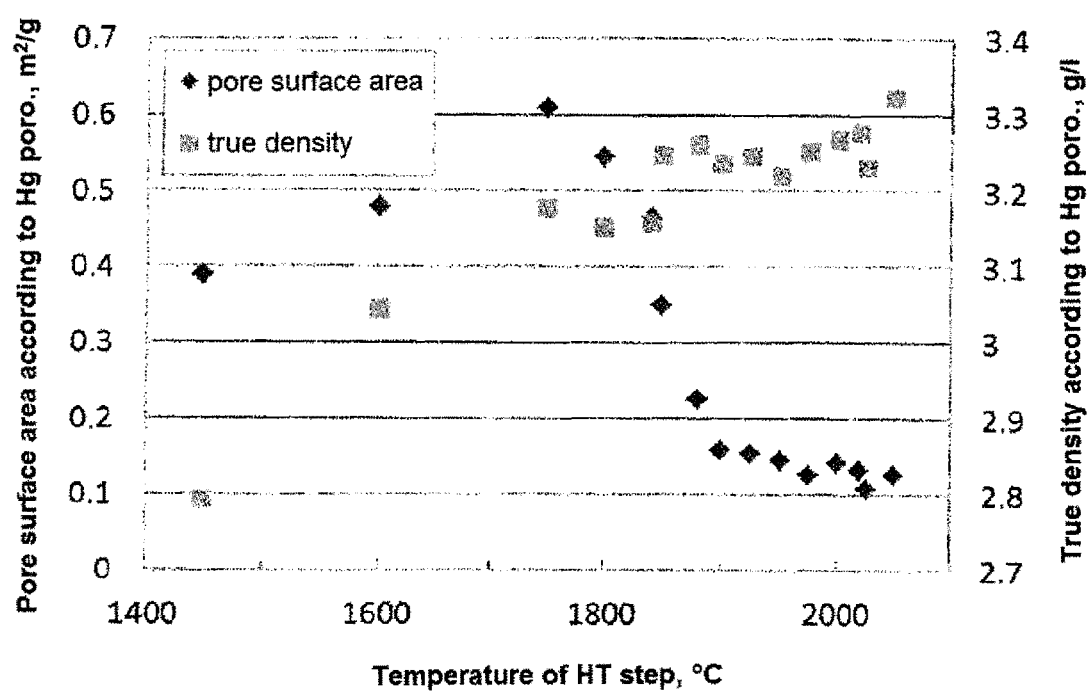

FIG. 13 shows the true density (skeletal density) in g/l calculated from the results of the mercury porosimetry as well as the specific pore surface area in m$^2$/g of the alternately sealed honeycomb filters (width and height of 35 mm, length 178 mm) produced in embodiment example 1 at different maximum temperatures, in each case given as temperature of the HT step.

Figure 14:
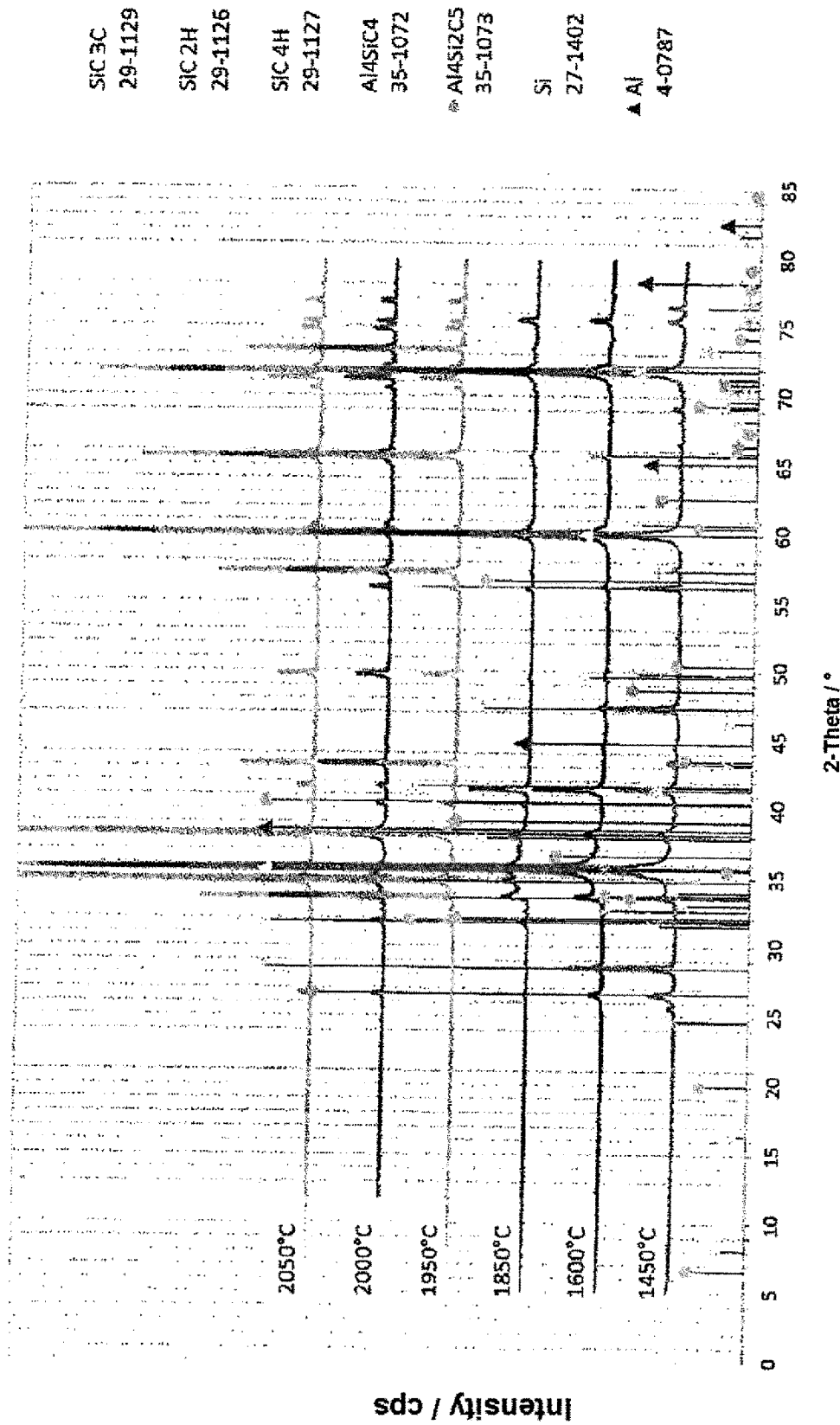

FIG. 14 shows the respective XRD spectra (X-Ray Diffraction) of the alternately sealed honeycomb filters (width and height of 35 mm, length 178 mm) produced in embodiment example 1 at different maximum temperatures.

Figure 15:
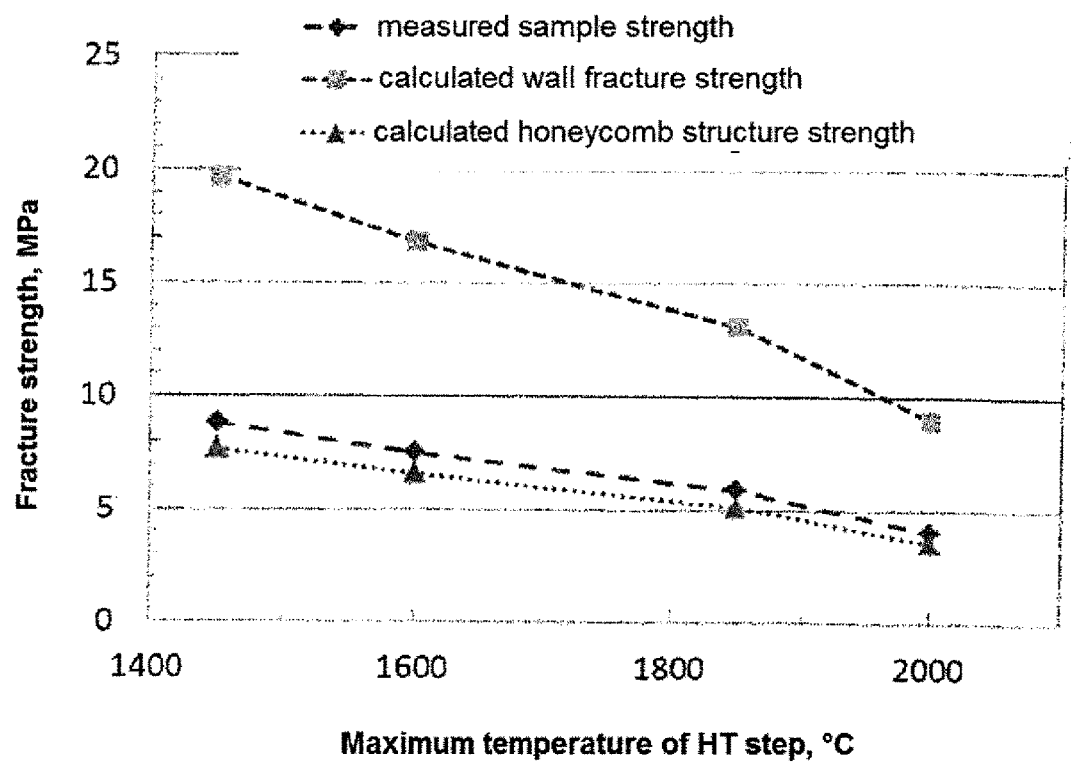

FIG. 15 shows the strength, determined on the basis of the ASTM standard designation C 1674-08, of test specimens of the dimensions 10 channels*10 channels*120 mm as an average of in each case 8 test specimens which have been produced in embodiment example 1 at different maximum temperatures, in each case given as temperature of the HT step. Also plotted are the values for the wall fracture strength and the honeycomb structure strength calculated according to ASTM C 1674-08.

Figure 16:
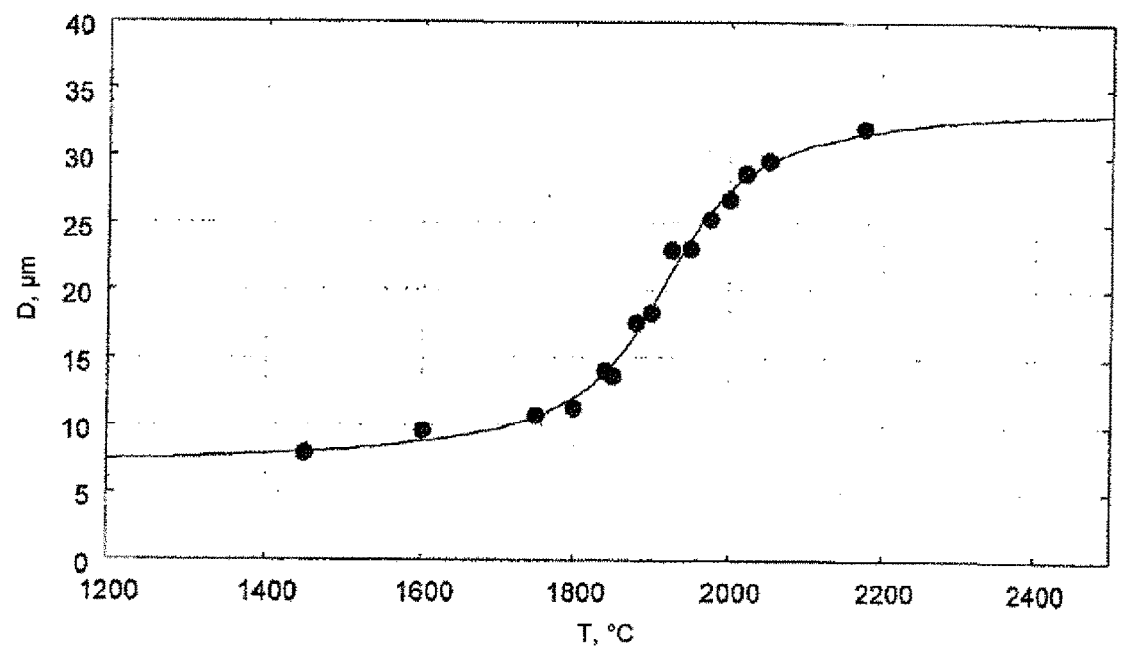

FIG. 16 shows the from the measured pore diameters (D) of the alternately sealed honeycomb filters (width and height of 35 mm, length 178 mm) produced in embodiment example 1 at different maximum temperatures, in each case given as temperature of the HT step together with an adaptation of these measured values to the function of the pore diameter as a function of the maximum temperature according to equation (1).

Figure 17:
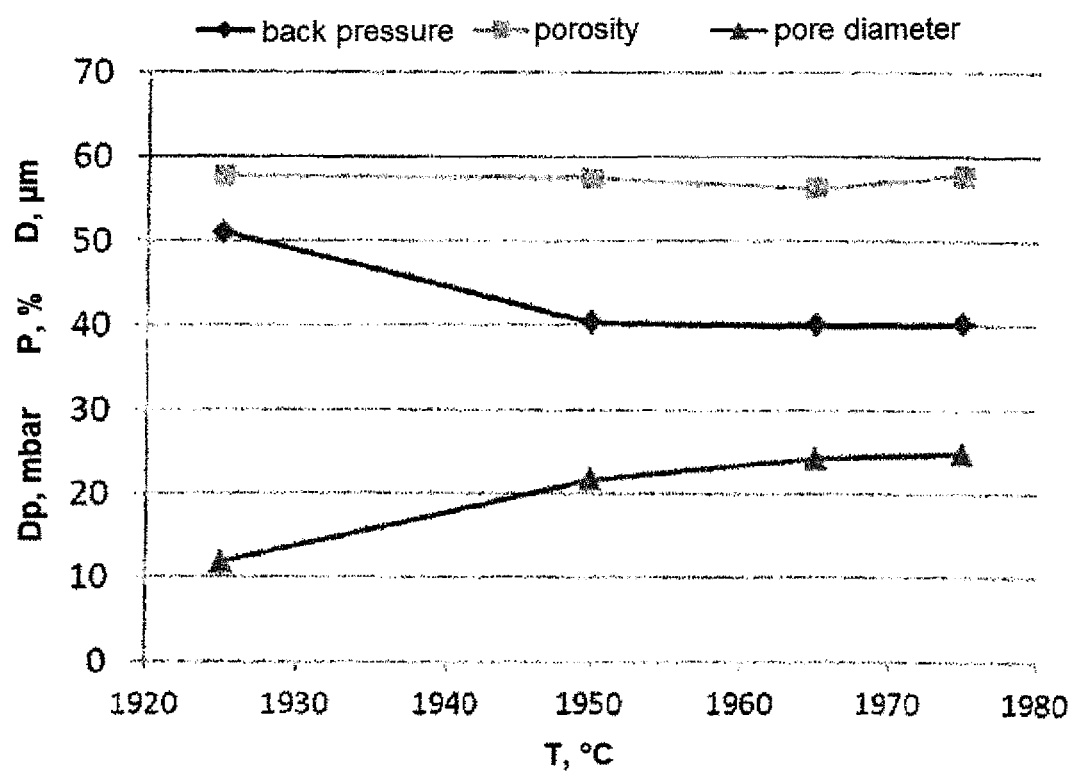

FIG. 17 shows the back pressure (Dp) in mbar, the average pore size (D) in μm and porosity (P) in vol.-%, in each case relative to the external volume of the honeycomb filter, wherein the volume of open channels was not factored in, of the alternately sealed honeycomb filters (width and height of 35 mm, length 178 mm) produced in embodiment example 2 at different maximum temperatures, in each case given as temperature of the HT step.

FIG. 18 shows an electron microscope magnification of a SiC shaped body from embodiment example 2b (FIGS. 18a to c) and of a SiC shaped body from comparison example 3 (FIGS. 18d to f). FIGS. 18a and 18d in each case shows a view of a channel wall at 100× magnification. FIGS. 18b and 18e in each case shows the cross-section of a channel wall at 150× and 160× magnification, respectively. FIGS. 18c and 18f in each case shows a cut-out section of the wall cross-section represented in FIG. 18b and FIG. 18e, respectively, at 1000× magnification.

Figure 19:
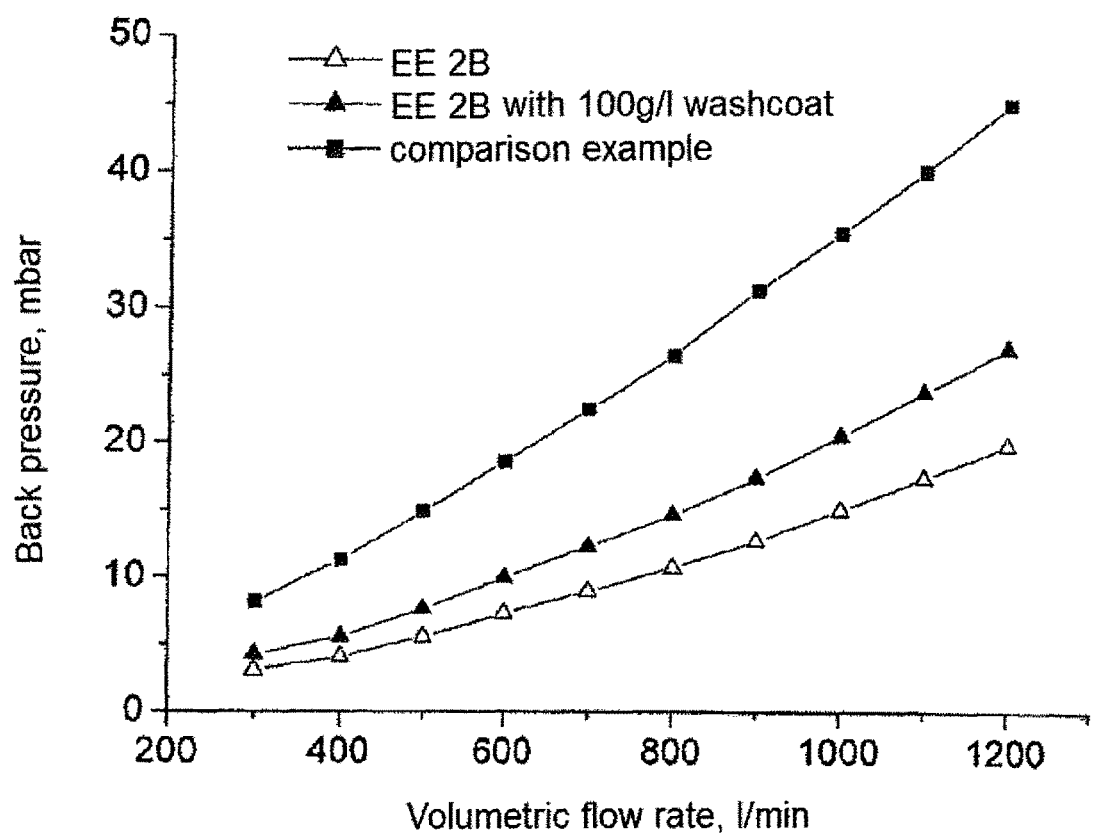

FIG. 19 shows the back pressure without soot loading and with soot loading (100 g/l), at increasing flow-through rates, of a SiC shaped body from embodiment example 2b ("EE 2B" and "EE 2B with 100 g/l washcoat") of a SiC shaped body from comparison example 3 ("comparison example").

EMBODIMENT EXAMPLE 1 (EE 1)

On the basis of the processes described in documents EP1 741 685 A1, U.S. Pat. No. 7,648,932 B2 and U.S. Pat. No. 7,867,313 B2, reaction-formed beta-SiC-containing shaped bodies were produced. The siliconization was carried out at a temperature at 1450° C.

The reaction-formed beta-SiC-containing shaped bodies were subsequently subjected to a heat treatment, wherein the shaped bodies were heated in each case to different maximum temperatures (1450° C., 1600° C., 1750° C., 1800° C., 1840° C., 1850° C., 1885° C., 1900° C., 1925° C., 1950° C., 1975° C., 2000° C., 2020.1° C. or 2050° C.). The effect of the temperature treatment on the pore structure of the SiC shaped bodies and their filter properties was investigated.

The residence time at maximum temperature was 20 min. In some cases the influence of longer residence times was investigated.

For the investigations of the influence of the temperature treatment, in each case 3 honeycomb bodies of the dimensions 35 mm*35 mm*210 mm (height*width*length) were subjected to temperature treatment simultaneously. All honeycombs used came from one extrusion run. All honeycombs used were pyrolyzed in one run.

The composition of the extrusion material for producing all the shaped bodies used in this test series is given in Table 1.

TABLE 1

| Composition of the extrusion material | |
| --- | --- |
| Component | Proportion, weight-% |
| Graphite | 17% |
| Pyrolysis binder | 8% |
| Silicon | 45% |
| Aluminum | 4.8% |
| Binder | 5.7% |
| Water | 16% |
| Pore former | 3% |
| Plasticizer | 0.5% |

A finely ground electrode graphite from Richard Anton KG (Gräfelfing, Germany) with an average grain size of approx. 17 μm was used as graphite. The silicon powder was obtained from Elkem AS. The powder had an average particle size of approx. 65 μm.

A starch solution from Zschimmer und Schwarz GmbH & Co KG (Lahnstein, Germany) was used as pyrolysis binder. A powder from Grimm Metallpulver GmbH (Roth, Germany) was used as aluminum. Methocel types from DOW were used as binder.

The pore former was a polyamide powder from Evonik Industries AG (Essen, Germany). A polyoxyethylene from Zschimmer und Schwarz was used as extrusion additive. The water used was demineralized.

The dry and wet components were first mixed separately in isolation for 30 minutes for homogenization. The two pre-mixtures were then kneaded in a double-Z-kneader for 4 hours. The extrusion took place with a piston extrusion press. After the extrusion, the extrudate was cut into shaped bodies with a length of 210 mm. Height and width of the honeycombs was 35 mm*35 mm. The die used for square honeycombs with square channels had a cellularity of 300 cpsi (cells per square inch). Wall thickness according to the die was 11.5 mils (milli-inch).

The drying of the segments took place by means of microwaves. After complete drying (residual moisture 1-2 mass-%) in a drying oven, all honeycombs were pyrolyzed in one run. The honeycombs here were heated up slowly to 850° C. under flowing nitrogen (technical grade 2.8). The organic components were broken down and expelled or converted into non-volatile pyrolysate which remained in the shaped bodies.

For the siliconization of the shaped bodies, in each case three honeycombs were first heated up to 1450° C. in a graphite oven under gentle argon flow (argon grade 5.0). The residence time was two hours. Then a residence phase at 1600° C. for one hour took place as a further intermediate stage. The heating rates above 1000° C. were in each case 5 K/min.

After this residence time, the shaped bodies, in turn, were heated at a heating rate of 5 K/min to the respective maximum temperature (1450° C., 1600° C., 1750° C., 1800° C., 1840° C., 1850° C., 1885° C., 1900° C., 1925° C., 1950° C., 1975° C., 2000° C., 2020.1° C. or 2050° C.) and held for 20 minutes, or for the stated residence time, at the respective maximum temperature.

The cooling then took place within 20 hours to room temperature.

For the purposes of comparison, shaped bodies were also heated for the duration of four hours to a temperature of 1450° C. without a further temperature increase being carried out.

A subsequent oxidation of the honeycombs to increase the strength and to burn off residual carbon is possible and customary for later use, but was not carried out for these tests.

The following properties were investigated for the SiC shaped bodies obtained in each case:
 mass loss
 changes in dimension
 back pressure of honeycombs with alternately sealed channels
 mechanical stability of test specimens of the size 10*10 channels at a length of 120 mm (4-point bending test)
 phase analysis by means of XRD
 scanning electron microscopy
 porosity and pore-size distribution, as well as density by means of mercury porosimetry In part, the honeycomb channels were sealed alternately for this:

Investigation Under Scanning Electron Microscope (SEM)

The investigation under SEM clearly showed how the pore structure looks before the opening of the passage openings and after the opening of the passage openings.

Figure 1:
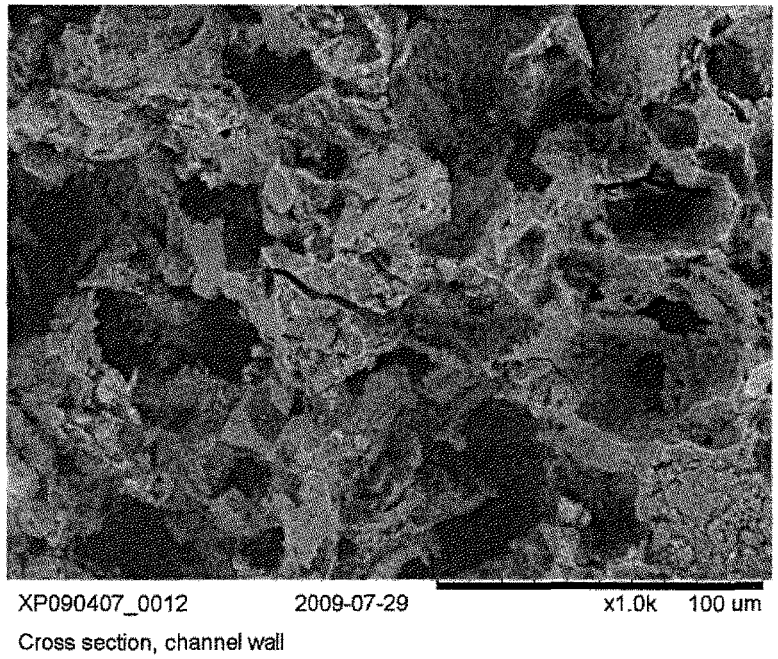
Figure 2:
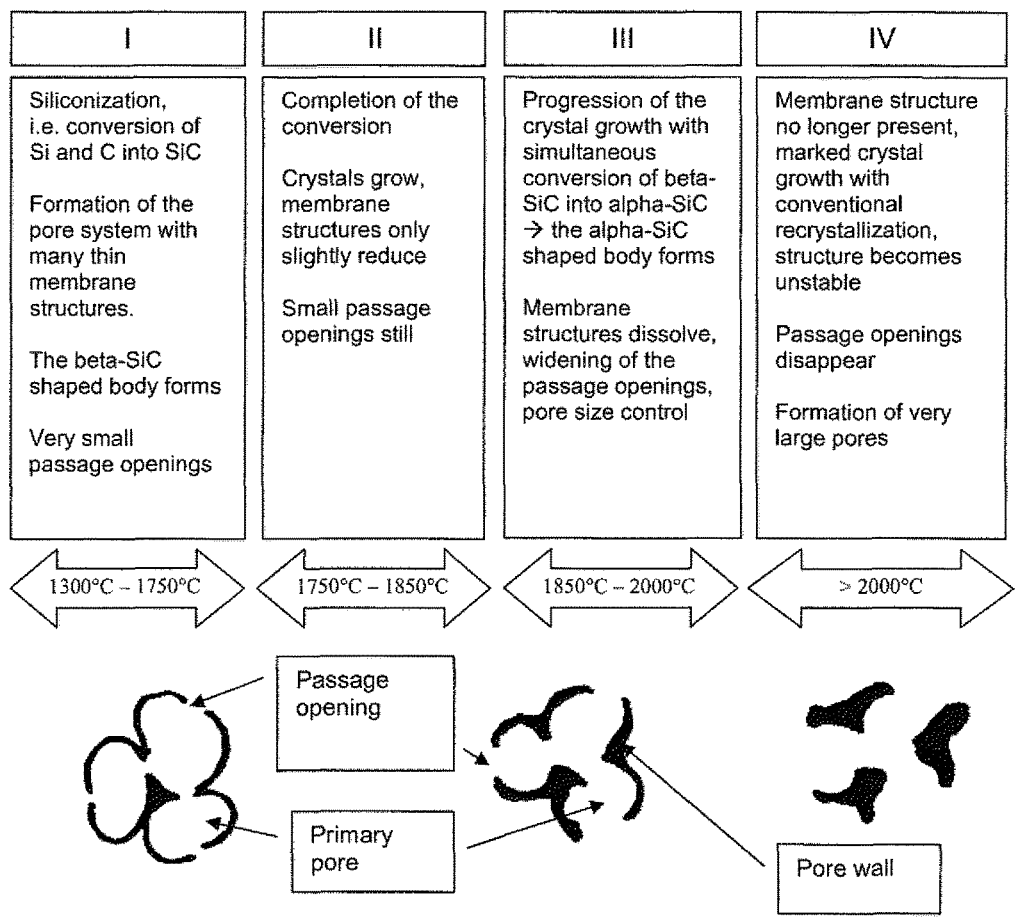
Figure 3A:
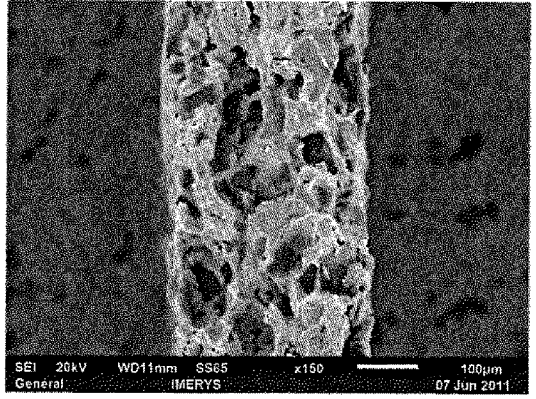
Figure 3B:
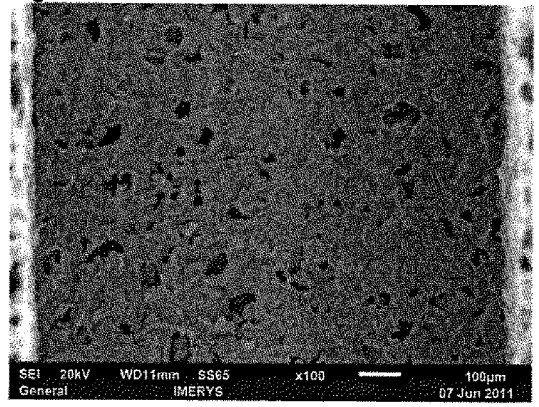
Figure 4A:
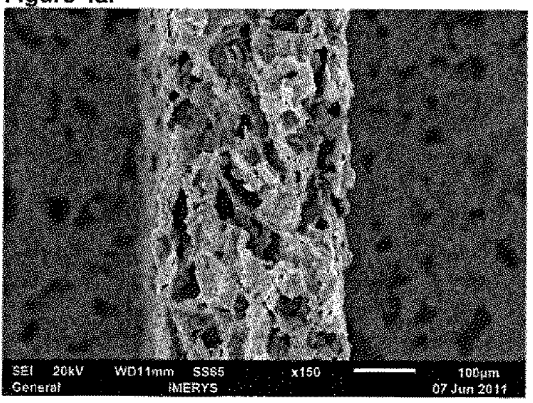
Figure 4B:
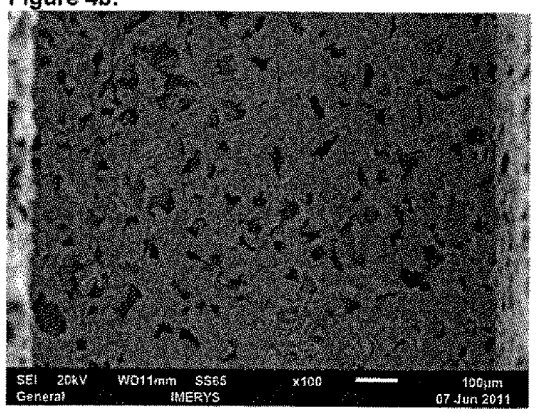

The pore structure of a SiC shaped body after heating to a maximum temperature of 1450° C. for 4 hours and 1850° C. for 20 minutes is represented in FIGS. 3 and 4 respectively. Crystalline-looking structures can already be recognized, but many amorphous-looking eggshell-shaped structures can also still be recognized.

Figure 5A:
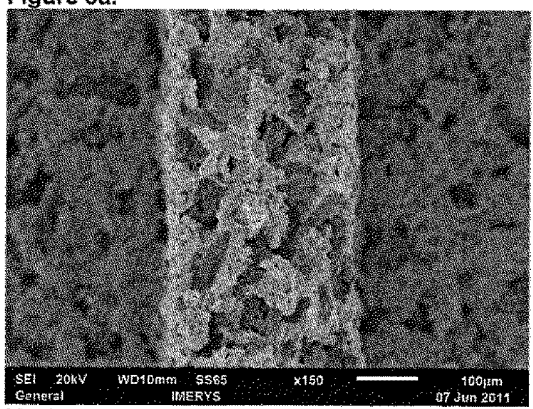
Figure 5B:
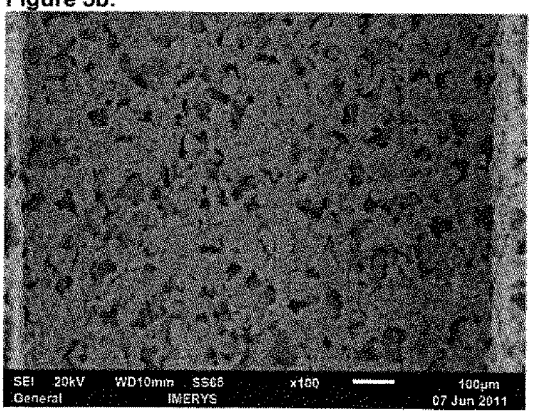
Figure 6A:
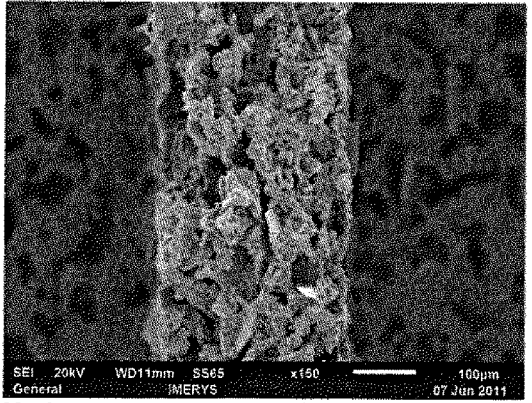
Figure 6B:
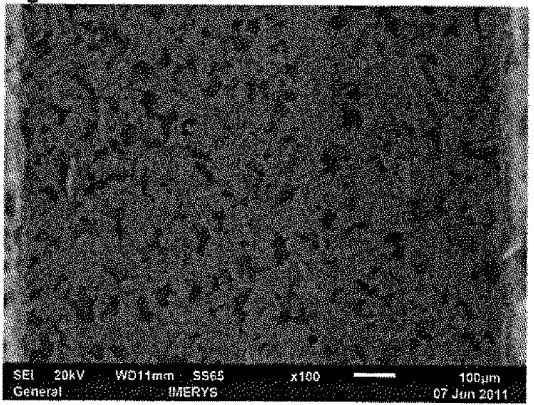

The pore structure of a SiC shaped body after heating to a maximum temperature of 1950° C. and 2000° C. for 20 minutes can be seen in FIGS. 5 and 6 respectively. The amorphous-looking areas have disappeared and only crystalline-looking areas can still be recognized with large pore passage openings.

At temperatures above 2000° C. the size of the crystallites increases further and the microstructure becomes more unstable through further opening, as is already indicated in the 2000° C., 20 minutes' residence time sample.

Figure 7A:
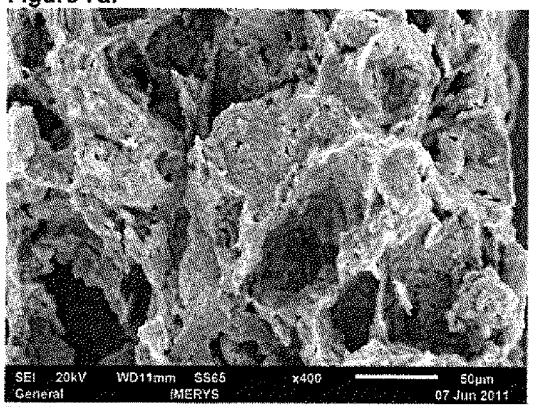
FIG. 7 shows a cut-out section of the wall cross-section represented in FIG. 3a at 400× (FIG. 7a) and 1000× (FIG. 7b) magnification.
Figure 7B:
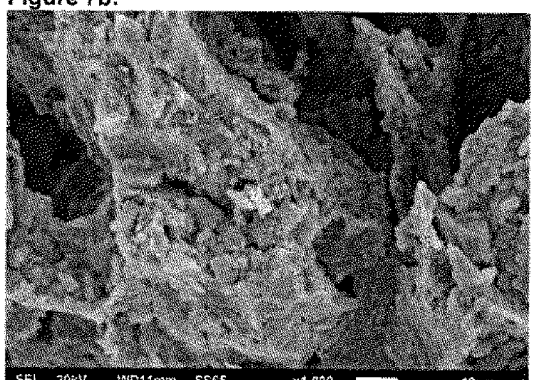
Figure 8A:
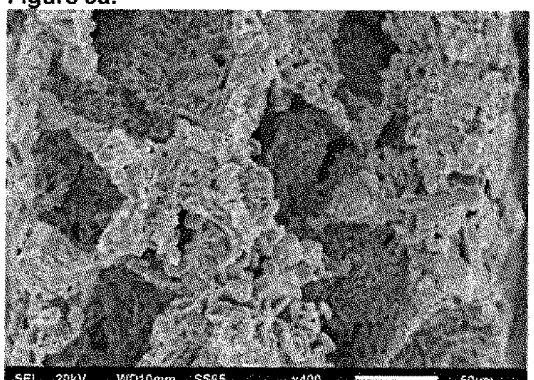
FIG. 8 shows a cut-out section of the wall cross-section represented in FIG. 5a at 400× (FIG. 8a) and 1000× (FIG. 8b) magnification.
Figure 8B:
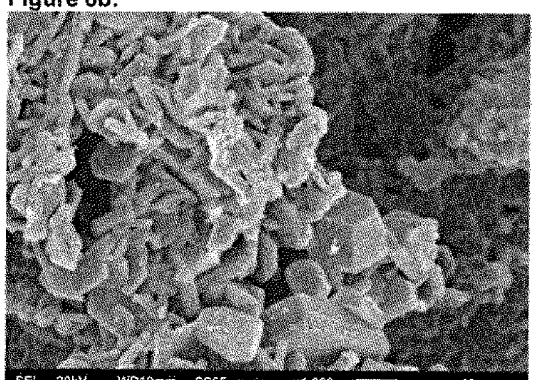

In the higher magnifications in FIGS. 7 and 8 it can be recognized that the microstructure with the large cavities is preserved during the temperature treatment. The starting structure which is based on the reaction-formed SiC is thus the basis for the microstructure of the shaped body treated at higher temperatures. At the same time, it can be clearly recognized that the structure of the skeleton has passed over from amorphous-looking to fine crystalline-looking.

The mass loss, the change in length, and the thermal mass calculated from the external dimensions (length*width*height) and the mass of the honeycombs, for different maximum temperatures, are represented in FIG. 9.

As can be seen, the large mass loss between 1450° C. and 1600° C. is followed by only a smaller further mass loss. The cause of the mass loss is initially evaporating aluminum and silicon. Above 1800° C. SiC can also evaporate in small amounts.

Above 1900° C. a slight shrinkage occurs in the segments. Between 1450° C. and 1600° C. a slight swelling is present, which is caused by rearrangement processes as well as the solidification anomaly of the residual silicon. As the thermal mass results from the volume and the weight of the segments, this remains relatively constant.

The pressure loss curves of alternately sealed honeycombs (length 178 mm) without soot loading at increasing flow-through rates are represented in FIG. 10. A clear reduction as the maximum temperature of the honeycombs increases can be seen, which takes place in the range 1800° C. and 1900° C. almost as a jump.

The porosities and average pore diameters, determined by means of mercury porosimetry, of the honeycombs produced at different maximum temperatures are represented in FIG. 11. The porosity increases for the temperature range between 1450° C. and 1850° C. by approx. 10% to 20%, which can be attributed to the evaporation of aluminum and silicon and to rearrangement effects. The above-described swelling effects between 1450° C. and 1600° C. also increase the porosity of the honeycombs. Above 1850° C. the porosity remains almost constant.

The average pore sizes and the flow-through speed through the channel walls, at a constant drop in pressure, of the honeycombs produced at different maximum temperatures are represented in FIG. 12.

The true density (skeletal density) as well as the specific pore surface area were also calculated from the measurements of the mercury porosimetry and are represented in each case in FIG. 13.

Due to the evaporation of aluminum and silicon and the further reaction of remaining carbon and silicon to form SiC, the true density of the material continuously increases with increasing maximum temperature. The increase in the specific pore surface area up to 1750° C. can likewise be explained by the evaporation of material as well as the further reaction to form SiC and thus the further formation of the microstructure.

After completion of the reaction, a microstructure of a framework formed from SiC with thin membranes which formed a pore system with coarse pores was present. The pores, in turn, were connected to each other via narrow passages in the membrane structure. The narrow passages explain the small pore diameter with, at the same time, high porosity and large specific pore surface area. With increasing temperature, the passage channels in the membranes slowly widened, or the membranes slowly dissolved, with the result that the average pore opening diameter increased and the pore surface area, on the other hand, became smaller, while the porosity remained almost unchanged.

By means of X-ray diffraction (XRD), the crystalline phases that formed were determined for powdered samples, of the honeycombs produced at different maximum temperatures. The samples were investigated with a D500 diffractometer from Bruker AXS GmbH (Karlsruhe, Germany) using the DIFFRAC plus software in the range 5°-80° 2 theta at an increment of 0.02° and a measurement time of 2 seconds in each case (total measurement time: approx. 2 hours).

The respective XRD spectra are represented in FIG. 14.

On the basis of the measurements represented, it can be recognized that during the transition from 1450° C. to 1750° C. the proportion of free silicon and aluminum declines sharply. The cause is the further reaction to form SiC, but also the evaporation of the components as well as the formation of three-component phases such as $Al_4SiC_4$ or $Al_4Si_2C_5$. As the temperature increases, the conversion of beta-SiC into alpha-SiC also takes place, wherein type 2H forms first and then later also phases 4H and others. Above 1950° C. beta-SiC can no longer be detected.

In addition to these main phases, nitrogen-containing or oxygen-containing phases can also be present in small proportions. Due to the low concentrations these are not to be determined and due to the mostly isomorphic incorporation additionally have similar reflections in XRD.

Due to the increasing pore opening diameters and the evaporation of material, the mechanical strength of the honeycomb bodies decreases. The strength, determined on the basis of ASTM standard designation C 1674-08, of test specimens of the dimensions 10 channels*10 channels*120 mm as an average of in each case 8 test specimens is represented in FIG. 15. It can be recognized that the mechanical strength of the honeycombs decreases as the siliconization temperature increases. Surprisingly, however, the strength is sufficient for processing to form filters.
Evaluation of the Pore Diameter as a Function of the Temperature.

The porosity data were adapted by means of arctangent(x) according to Formula (1):

$$D_{Pore}(T) = D_0 + \frac{D_1}{\pi} \cdot \left\{ \frac{\pi}{2} + \tan^{-1}\left(\frac{T - T_0}{T_1}\right) \right\} \quad (1)$$

For the above samples, the following parameters are obtained: $D_0$=6.35 µm, $D_1$=28.2 µm, $T_0$=1916° C., $T_1$=85.7° C. The associated diagram is represented in FIG. 16.

For the setup selected in this test series for the oven process to siliconize the honeycombs, a temperature specification of 1925±50° C. can thus be derived for the desired pore diameter $D_{pore}$=20±2 µm.

The energy per charge, which, however, cannot be determined comprehensively enough from the oven records, is also to be seen as decisive.

EMBODIMENT EXAMPLE 2a (EE 2a)

The shaped bodies used were produced as described in embodiment example 1. In the formulation, the use of pore formers was dispensed with and a graphite with an average grain size of approx. 11 µm was used, which resulted in a composition according to Table 2.

TABLE 2

Composition of the extrusion material

| Component | Proportion, weight-% |
|---|---|
| Graphite | 18.5% |
| Pyrolysis binder | 8.5% |
| Silicon | 48.2% |
| Aluminum | 5.3% |
| Binder | 4% |
| Water | 15% |
| Plasticizer | 0.5% |

In contrast to embodiment example 1, for these honeycombs a residence time of two hours at the respective final temperatures of 1925° C., 1950° C., 1965° C. and 1975° C. was selected.

As in embodiment example 1, shaped bodies with a width and height of 35 mm and a length of 178 mm in which the inflow and outflow channels were sealed alternately were also produced and measured for back pressure here. The result is represented in FIG. 17.

As can be seen from FIG. 17, a temperature of 1950° C. is already enough in order to optimally open the pores with a residence time of 2 hours and thus to set a minimum back pressure.

EMBODIMENT EXAMPLE 2b (EE 2b)

The shaped bodies used were produced as described in embodiment example 1, wherein a composition according to Table 2 was used to produce the shaped bodies.

As in embodiment example 2a, the shaped bodies produced had alternately sealed inflow and outflow channels and had a cell density of 200 cpsi (cells per square inch) and a channel wall thickness of 400 µm. The width and height of the shaped bodies was 49 mm, the length was again set to 178 mm.

This design is very widespread in the field of off-road uses, in which very stable and robust systems are necessary.

The shaped bodies produced in this way were treated at a maximum temperature of 1965° C. for two hours and had the following properties:
Porosity: 58 vol.-%, relative to the external volume of the shaped body, wherein the volume of open channels was not factored in,
Average pore diameter: 23 µm
Specific weight: 560 g/l

COMPARISON EXAMPLE 3

In accordance with document U.S. Pat. No. 4,777,152, a shaped body with 200 cpsi cell density and a wall thickness of 400 µm was produced on the basis of a beta-SiC powder.

The aluminum content was set to 1 wt.-%, relative to the proportion of SiC. Preliminary tests with compacts resulted in the best results for this proportion with respect to the stability of the shaped body at a sintering temperature of 2000° C.

The beta-SiC powder used was obtained from Superior Graphite Europe Ltd. (Sundsvall, Sweden) and had the designation HSC-1200. The average grain size was 6.26 µm. In the case of the particle size, the upper limit of the range stated in document U.S. Pat. No. 4,777,152 was selected. The formulation is specified in Table 3.

TABLE 3

Composition of the extrusion material

| Component | Proportion, weight-% |
| --- | --- |
| SiC (HSC1200) | 74.8% |
| Binder | 5.1% |
| Glycerol | 1.5% |
| Aluminum | 0.7% |
| Polyethylene glycol | 1.8% |
| Water | 15.9% |
| Plasticizer | 0.2% |

The shaped body obtained had the following properties:
Porosity: 40 vol.-%, relative to the external volume of the shaped body,
wherein the volume of open channels was not factored in,
Average pore diameter: 8 µm
Specific weight: 770 g/l The investigation under SEM clearly showed that a much higher porosity in the shaped body was achieved according to the invention via the process according to the invention without addition of a porosifier. In order to be able to set a much larger pore width according to the process used in the comparison example, a beta-SiC powder with a much larger average grain size would have to be selected. The corresponding SEM photographs are represented in FIGS. 18a to 18f.

Furthermore, the shaped body produced in embodiment example 2b has a different microstructure in contrast to the shaped body produced in the comparison example. Whereas the shaped body produced in embodiment example 2b has the typical structure with large primary pores and smaller passage pores analogously to a foam-like structure, the structure of the shaped body produced in the comparison example has the typical microstructure of a grain ceramic.

The advantages of the higher porosity and the thereby greatly improved absorption capacity for high washcoat loadings becomes clear by comparing the drops in pressure. These are represented in FIG. 19: with the high washcoat loading of 100 g/L, the filter of EE 2b still has a much lower back pressure than that of the comparison example. This is only possible due to the much higher porosity and the larger pore diameters which arise in-situ through the production process.

The invention claimed is:

1. A porous, open-pored, gas-permeable alpha-silicon carbide (SiC) containing shaped body comprising:
platelet-shaped crystallites connected to form an interconnected, continuous skeletal structure, wherein the skeletal structure consists of more than 80 wt-% alpha-SiC, relative to the total weight of SiC,
the porous, open-pored, gas-permeable alpha-silicon carbide (SiC) containing shaped body having an average pore diameter of 3 µm to 50 µm and an open porosity of 45% to 85% vol.-%, relative to a total volume of the porous, open-pored, gas-permeable alpha-silicon carbide (SiC) containing shaped body; and
wherein the average pore diameter of the porous, open-pored, gas-permeable alpha-silicon carbide (SiC) containing shaped body is greater than a size of the platelet-shaped crystallites and greater than an average thickness of pore walls constructed from said platelet-shaped crystallites.

2. The porous, open-pored, gas-permeable alpha-silicon carbide (SiC) containing shaped body according to claim 1, wherein the porous, open-pored, gas-permeable alpha-silicon carbide (SiC) containing shaped body further comprises flow-through channels which are arranged parallel to each other and have a wall thickness in a range of from 100 µm to 580 µm.

3. The porous, open-pored, gas-permeable alpha-silicon carbide (SiC) containing shaped body according to claim 1, wherein the average pore diameter of the shaped body is 5 µm to 50 µm, and the open porosity is 50% to 85% vol.-%, relative to the total volume of the shaped body.

4. The porous, open-pored, gas-permeable alpha-silicon carbide (SiC) containing shaped body according to claim 1, further comprising at least one ternary carbide of silicon, carbon and at least one element from main group 3 of the periodic table of the elements.

5. The porous, open-pored, gas-permeable alpha-silicon carbide (SiC) containing shaped body according to claim 4, wherein the at least one ternary carbide of silicon, carbon and at least one element from main group 3 of the periodic table of the elements contains aluminum.

6. The porous, open-pored, gas-permeable alpha-silicon carbide (SiC) containing shaped body according to claim 4, wherein the at least one ternary carbide is a carbide of the general empirical formula $Al_4C_3(SiC)_x$, wherein x is a whole number from 1 to 4, or a mixture thereof.

7. The porous, open-pored, gas-permeable alpha-silicon carbide (SiC) containing shaped body according to claim 4, wherein the at least one ternary carbide is 0.1 wt.-% to 10 wt.-%, relative to the total weight of SiC.

8. The porous, open-pored, gas-permeable alpha-silicon carbide (SiC) containing shaped body according to claim 1, wherein the alpha-SiC is at least partially present in at least one of 2H, 4H, 6H, 8H, 10H, 14H and 15R polytype.

9. The porous, open-pored, gas-permeable alpha-silicon carbide (SiC) containing shaped body according to claim 1, further comprising at least one of nitrogen and oxygen in an amount-of-substance fraction of less than 5 at.-%, relative to the sum of all constituents of the porous, open-pored, gas-permeable alpha-silicon carbide (SiC) containing shaped body.

10. The porous, open-pored, gas-permeable alpha-silicon carbide (SiC) containing shaped body according to claim 4, wherein the at least one ternary carbide is a carbide of the formula $Al_4SiC_4$, a carbide of the formula $Al_4Si_2C_5$, or a mixture thereof.

* * * * *